(12) United States Patent
Ikeda et al.

(10) Patent No.: US 7,266,577 B2
(45) Date of Patent: Sep. 4, 2007

(54) MODULAR MULTIPLICATION APPARATUS, MODULAR MULTIPLICATION METHOD, AND MODULAR EXPONENTIATION APPARATUS

(75) Inventors: Hanae Ikeda, Yokohama (JP); Kenji Kojima, Kawasaki (JP); Shinichi Kawamura, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 607 days.

(21) Appl. No.: 10/440,362

(22) Filed: May 19, 2003

(65) Prior Publication Data

US 2004/0015532 A1 Jan. 22, 2004

(30) Foreign Application Priority Data

May 20, 2002 (JP) ............................. 2002-144154
Jan. 24, 2003 (JP) ............................. 2003-016296

(51) Int. Cl.
*G06F 7/72* (2006.01)
(52) U.S. Cl. ...................... 708/491; 708/492
(58) Field of Classification Search ............... 708/491
See application file for complete search history.

(56) References Cited

U.S. PATENT DOCUMENTS

| | | | | |
|---|---|---|---|---|
| 5,361,221 | A * | 11/1994 | Fujita | 708/491 |
| 6,209,016 | B1 * | 3/2001 | Hobson et al. | 708/491 |
| 6,598,061 | B1 * | 7/2003 | Symes et al. | 708/491 |
| 6,804,696 | B2 * | 10/2004 | Chen et al. | 708/491 |
| 2003/0140077 | A1 * | 7/2003 | Zaboronski et al. | 708/491 |
| 2005/0033790 | A1 * | 2/2005 | Hubert | 708/492 |

FOREIGN PATENT DOCUMENTS

JP 05-324277 12/1993

OTHER PUBLICATIONS

Iwamura, K. et al., "Montgomery's Modular-Multiplication Method and Systolic-Arrays Suitable for Modular-Exponentiation", IEICE Trans. Fundamentals (Japanese Edition), Vo. J76-A, No. 8, pp. 1214-1223, (Aug. 1993).
Kawamura, S., et al., "Cox-Rower Architecture for Fast Parallel Montgomery Multiplication", Advances in Cryptology-Eurocrypt 2000, LNCS 1807, pp. 523-538, (2000).
Montgomery, P. L., "Modular Multiplication Without Trial Division", Mathematics of Computation, vol. 44, No. 170, (1985).
Iwamura, K., et al., "Systolic-Arrays for Modular Exponentiation Using Montgomery Method", Rump Session of Eurocrypt 92, LNCS, vol. 1440, pp. 477-481, Springer-Verlag, (1998).

(Continued)

*Primary Examiner*—D. H. Malzahn
(74) *Attorney, Agent, or Firm*—Finnegan, Henderson, Farabow, Garrett & Dunner, L.L.P.

(57) ABSTRACT

A modular multiplication apparatus comprises a calculation unit which comprises processing units including a multiplier-adder unit and performs a modular multiplication by carrying out pipeline processes by the processing units; and a calculator configured to, before a first pipeline process, carry out a predetermined calculation for a processing result of one of the processing units in a pipeline process immediately before the first pipeline process, and when the first pipeline processes supply a calculation result of the predetermined calculation to a processing unit at an initial stage of the first pipeline process.

10 Claims, 25 Drawing Sheets

OTHER PUBLICATIONS

Walter, C. D., "Montgomery's Multiplication Technique: How to Mark It Smaller and Faster", Proceedings of CHES '99, LNCS 1717, pp. 80-93, Springer-Verlag, (1999).

Walter, C. D., "An Improved Linear Systolic Array for Fast Modular Exponentiation", IEE Computers and Digital Techniques, vol. 147, No. 5, pp. 323-328, (Sep. 2000).

* cited by examiner

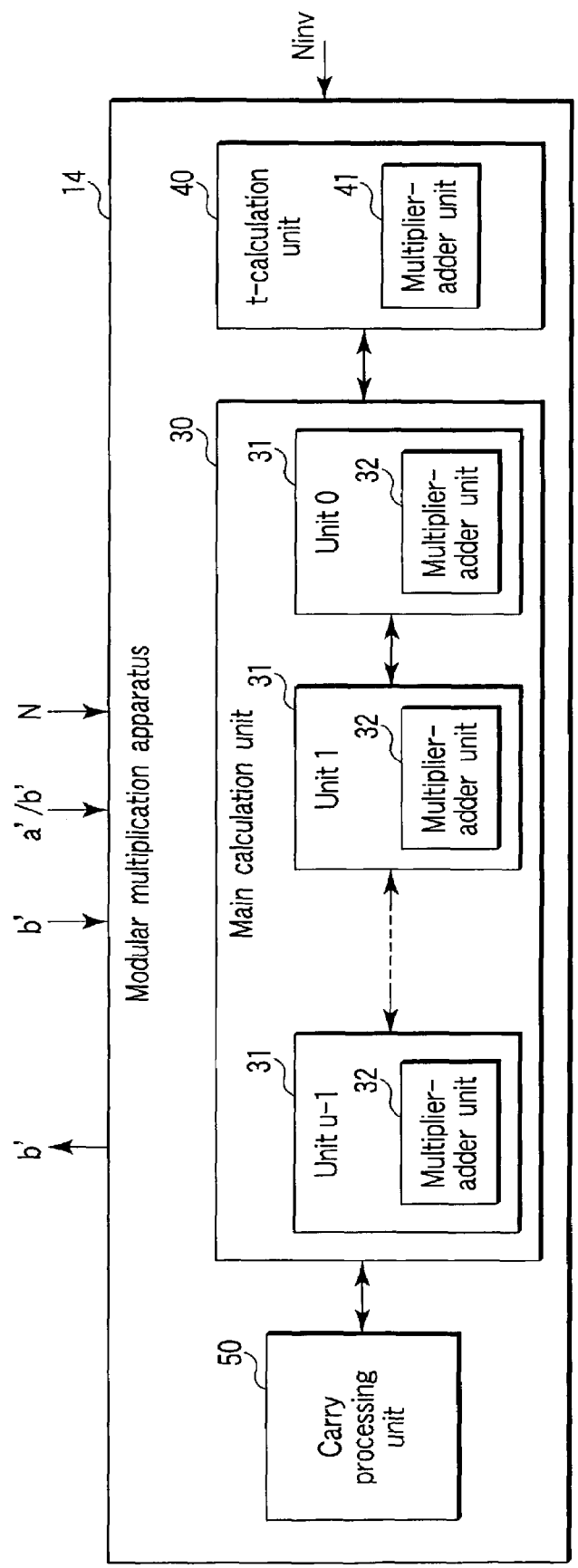
F I G. 5

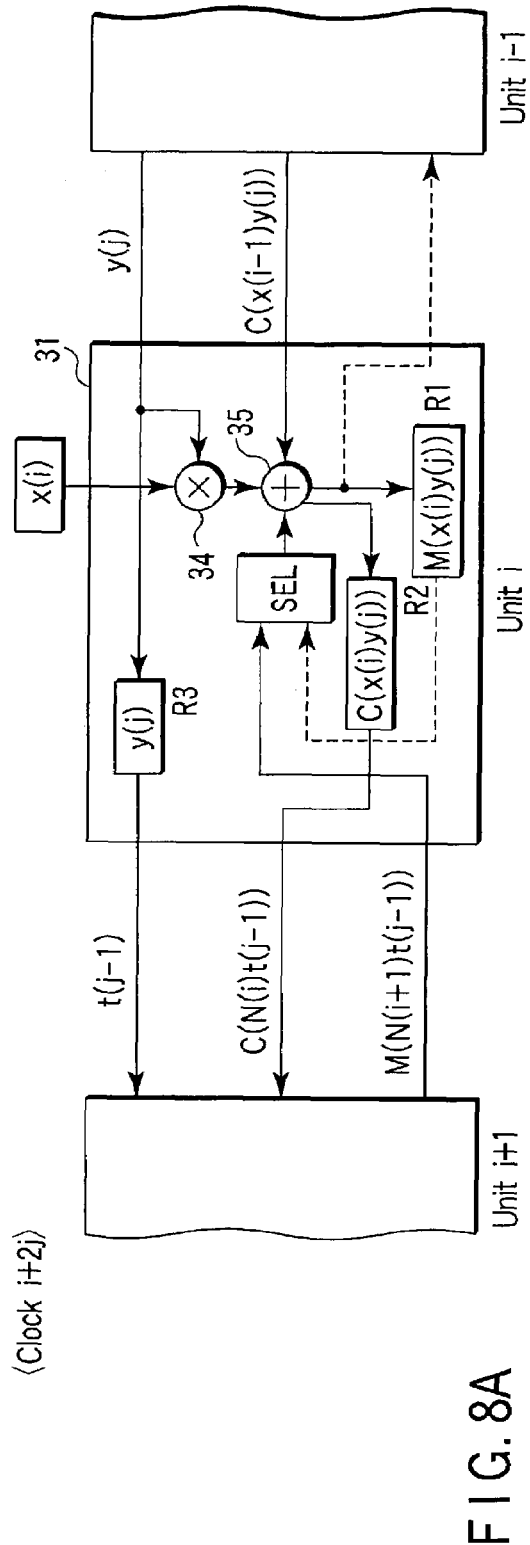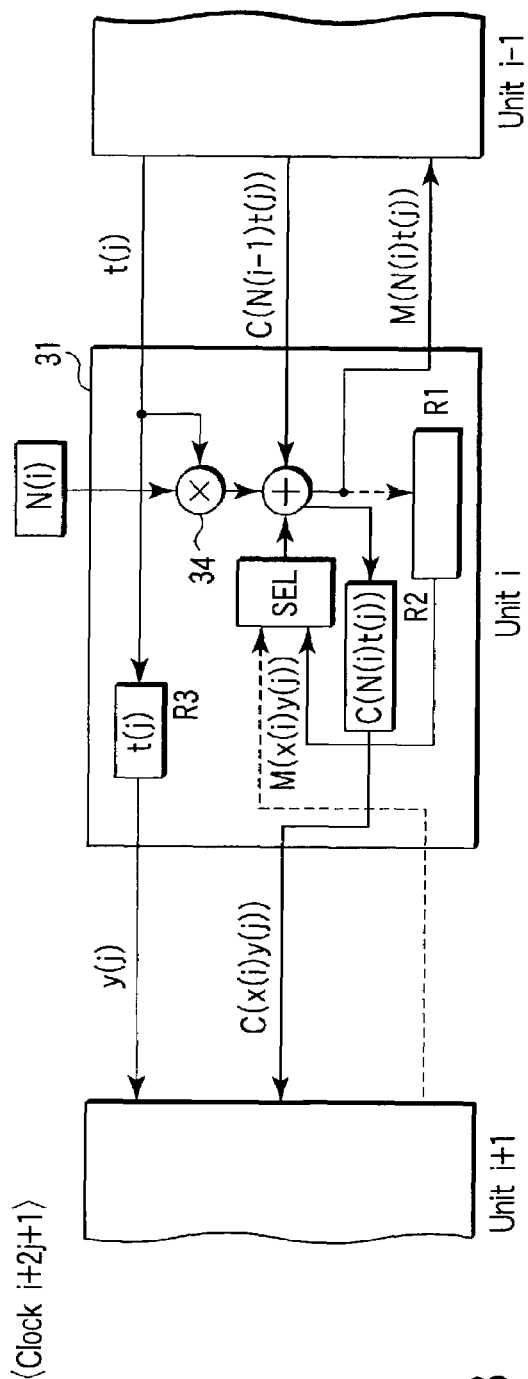
F I G. 8A
F I G. 8B

⟨Clock n+2j+1⟩

⟨Clock n+2j+2⟩

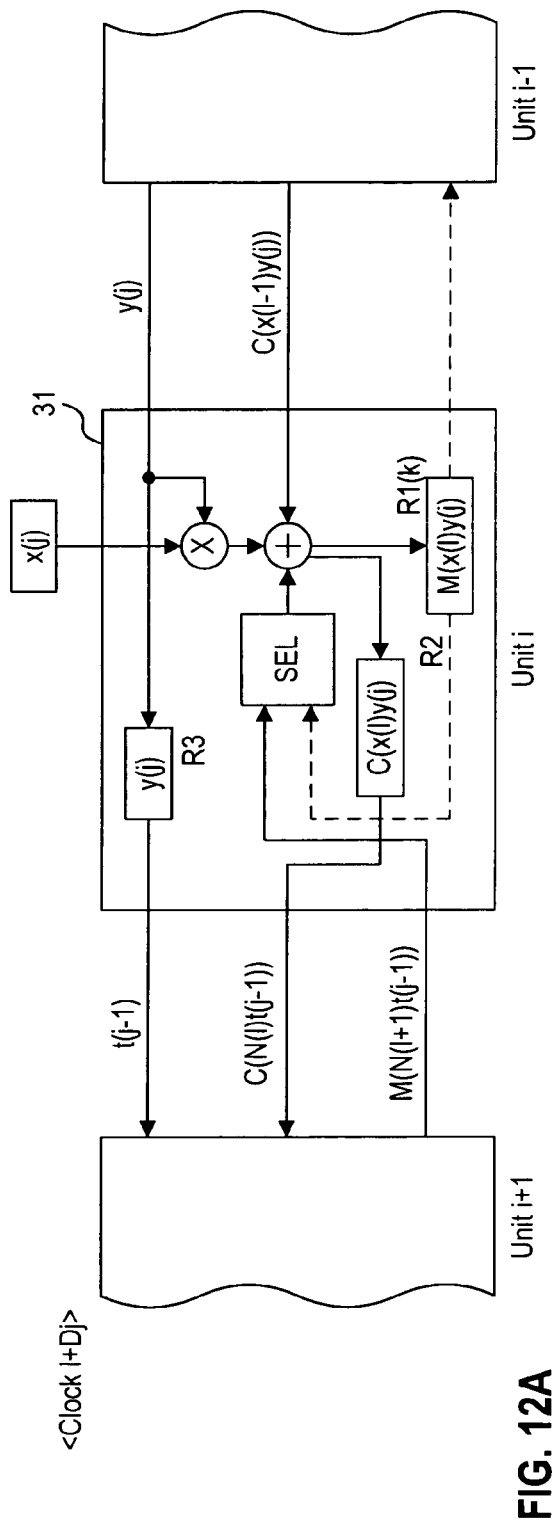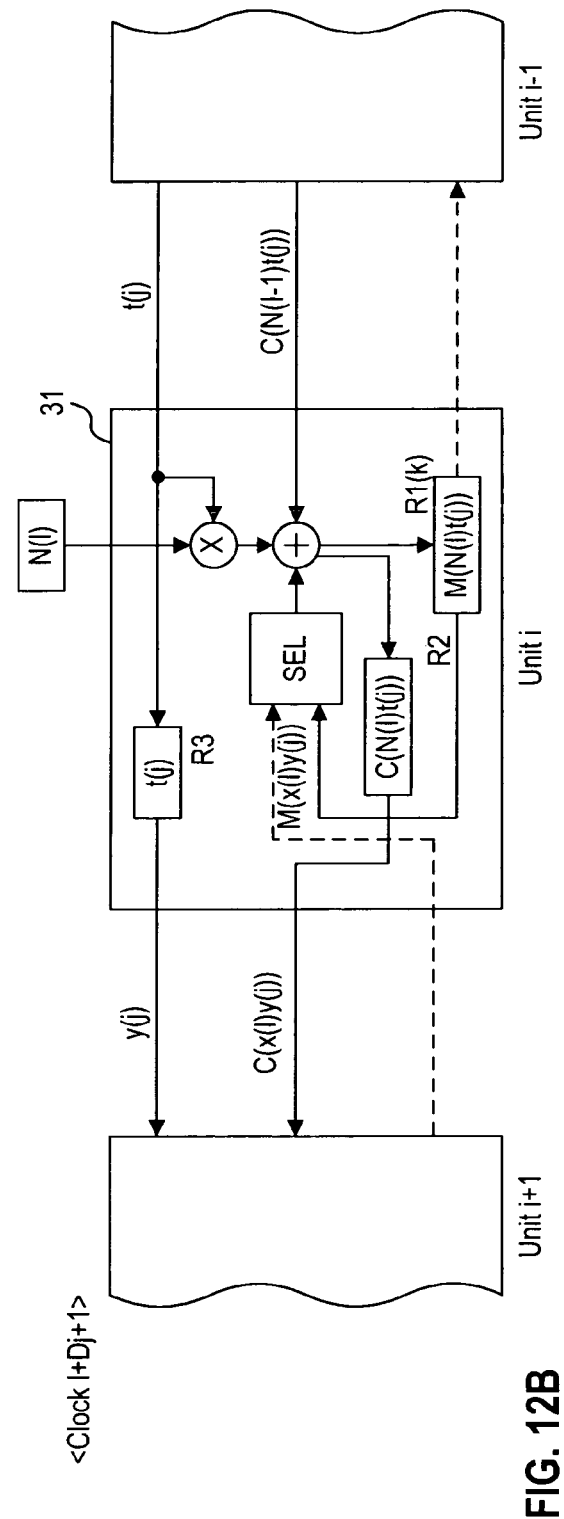
FIG. 12A
FIG. 12B

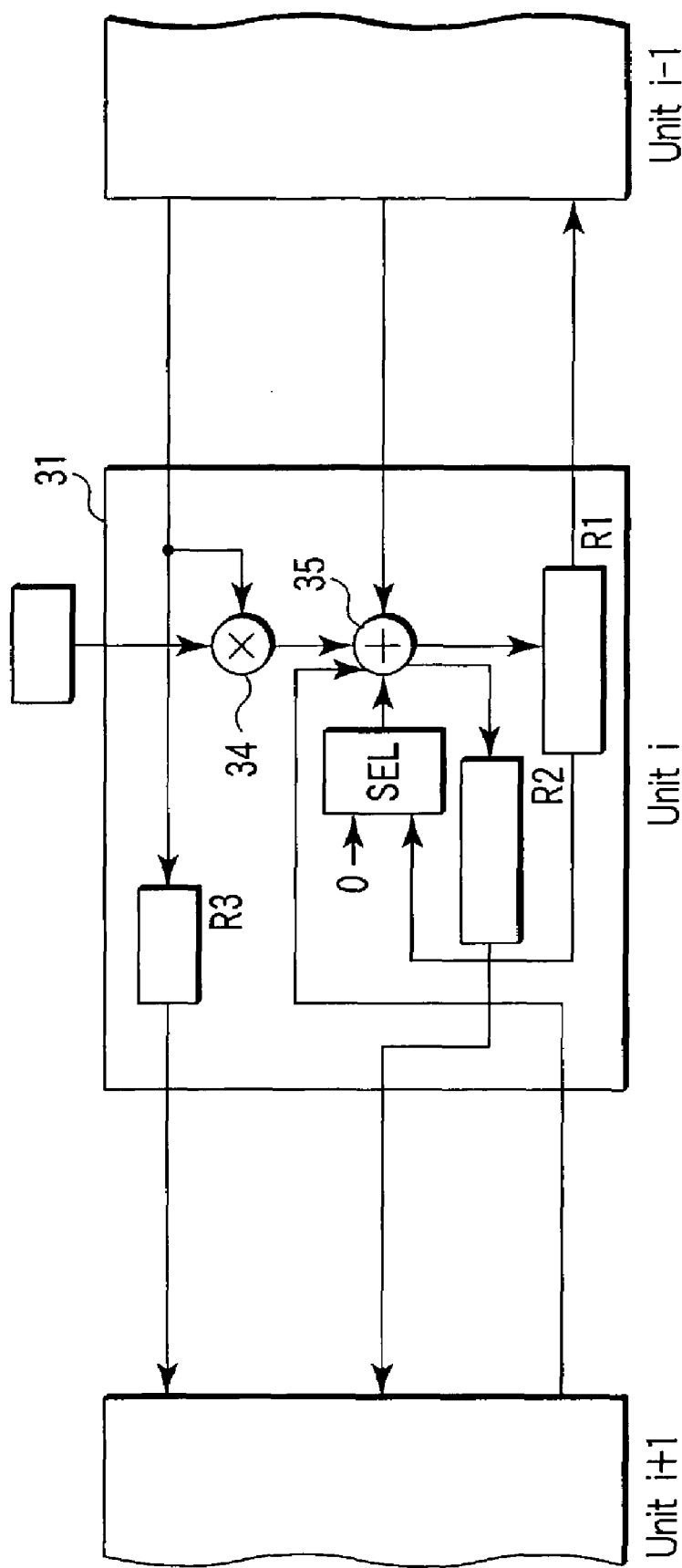
F I G. 15

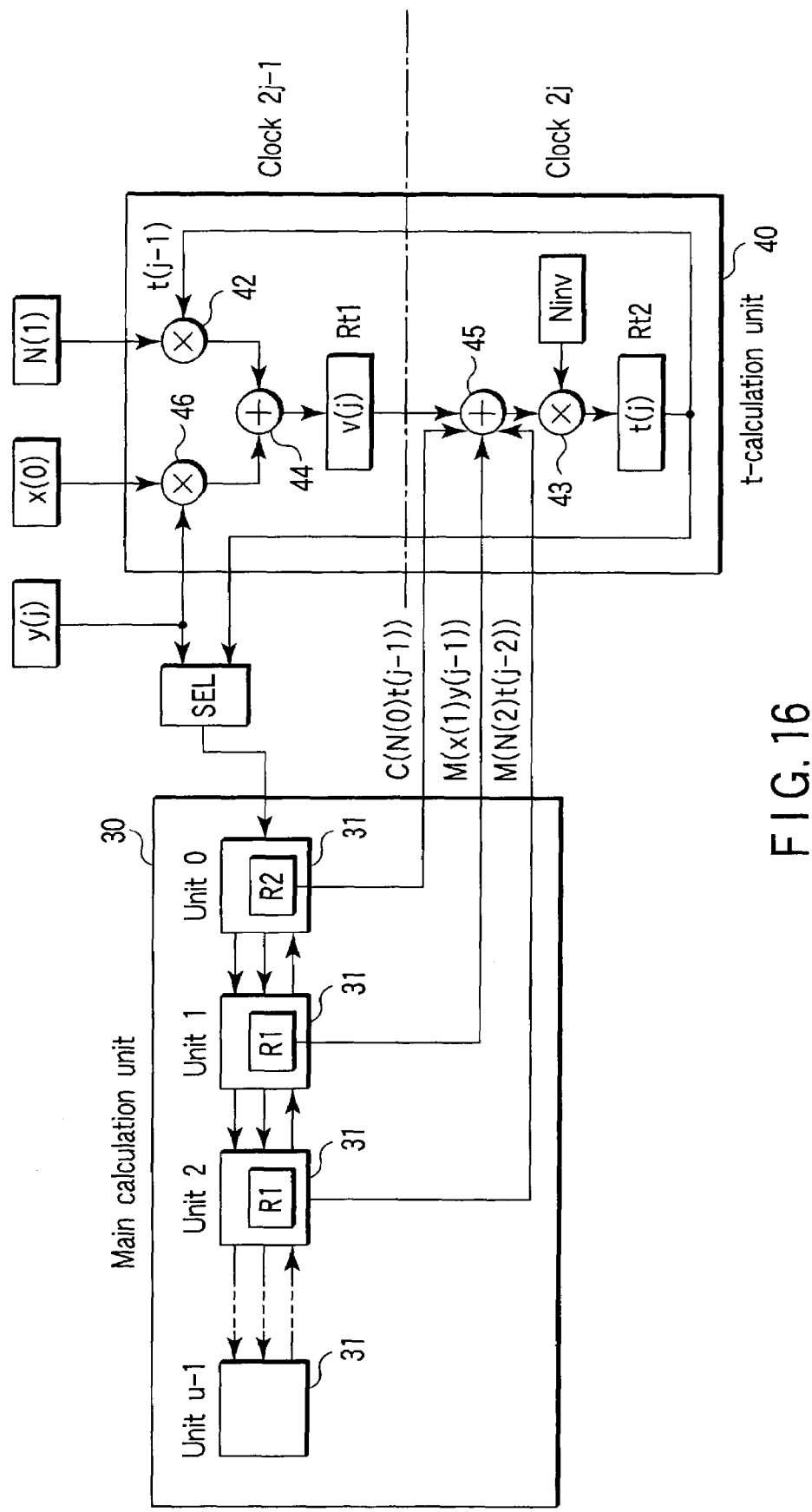
F I G. 16

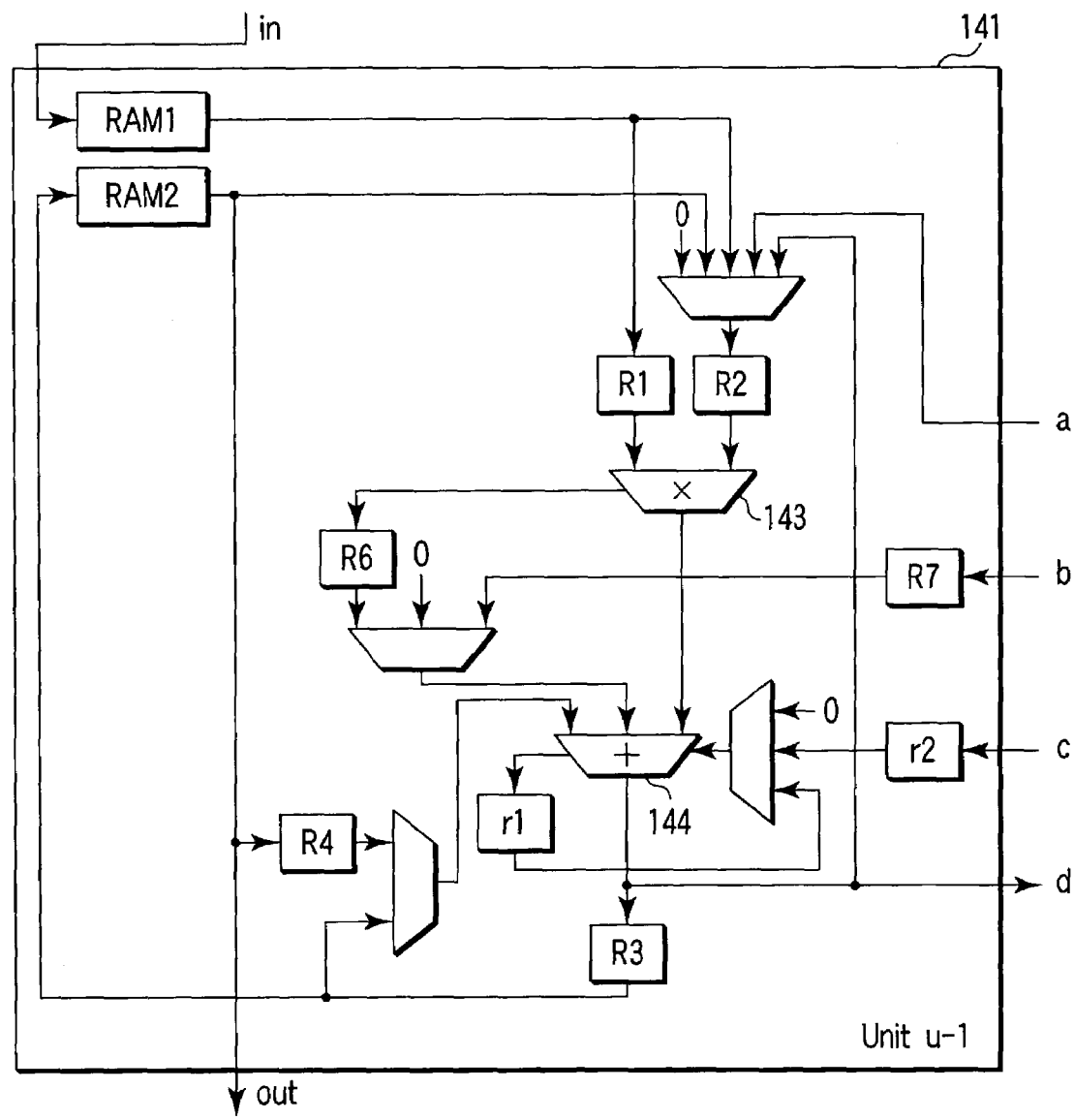
F I G. 21 ary edition), vol. J76-A,

MODULAR MULTIPLICATION APPARATUS, MODULAR MULTIPLICATION METHOD, AND MODULAR EXPONENTIATION APPARATUS

CROSS-REFERENCE TO RELATED APPLICATIONS

This application is based upon and claims the benefit of priority from the prior Japanese Patent Applications No. 2002-144154, filed May 20, 2002; and No. 2003-016296, filed Jan. 24, 2003, the entire contents of both of which are incorporated herein by reference.

BACKGROUND OF THE INVENTION

1. Field of the Invention

The present invention relates to a modular multiplication apparatus, a modular multiplication method, and a modular exponentiation apparatus which can calculate a large integer at a high speed by pipeline process.

2. Description of the Related Art

As a method of implementing "modular exponentiation" for use in an RSA public key cryptosystem, there is known a method for repeatedly executing multiplication with a modulo, which is called Montgomery multiplication proposed by Montgomery. For example, reference should be made to a first document, "Modular multiplication without trial division" by P. L. Montgomery, Mathematics of Computation, Vol. 44, No. 170, pp. 519-521, April 1985.

This Montgomery multiplication is a technique for executing multiplication with a residue by being substituted by addition and multiplication, and efficient implementation of modular multiplication is possible. In the Montgomery multiplication, calculation of xy+Nt is executed instead of calculating xy mod N. Here, x, y, N, and t are large integers.

In a conventional system of high speed implementation technique for Montgomery multiplication can be roughly divided into a system of carrying out Montgomery multiplication under which an integer is expressed in a binary expression and a system of carrying out Montgomery multiplication under which an integer is expressed by an RNS (Residue Number System).

In the system to be carried out under binary expression, x, y, N, and t are divided respectively in units of words. For example, x is divided into m words of $x(0), \ldots, x(m-1)$ from the least significant bit by r bits. This applies to y, N and t. Under this condition, Montgomery multiplication is carried out by subjecting multiplication in units of words to pipeline process by a plurality of processing units. That is, multiplication of $x(i)y(j)$ and $N(i)t(j)$ and summing calculation thereof are executed by assigning them to u units considering digit adjustment or digit round-up. At this time, it is important in algorithm of Montgomery multiplication that $t(j)$ is a variable determined depending on a result of calculation in progress, and contrivance on implementation is requested here. Reference should be made to a second document, "Montgomery's Multiplication Technique: How to Make It Smaller and Faster" by C. D. Walter, Proc. Workshop on Cryptographic hardware and Embedded Systems, CHES' 99, LNCS, Vol. 1717, pp. 80-93, Springer-Verlag, 1999, third document, "Montgomery's Modular-Multiplication Method and Systolic-Arrays Suitable for Modular-Exponentiation", by Keiichi Iwamura et al., IEICE Transaction, Fundamentals (Japanese edition), vol. J76-A, No. 8, pp. 1214-1223, 1993, and fourth document, Japanese Patent Publication (KOKAI) No. 5-324277.

The second document discloses that each unit has two multiplier for the purpose of executing calculation of $x(i)y(j)+N(i)t(j)$ in a single clock in a unit "i". However, because of a trade-off with calculation $t(j)$, each standby state occurs in two clocks, and further, redundant multiplication occurs for calculation of $t(j)$. As a result, a delay is imparted to this calculation due to pipeline process (a critical path is lengthened).

The fourth document discloses that each unit has two multipliers as in the second document for the purpose of executing calculation of $x(j)y(i+1)+N(j+1)t(i)$ in a single clock in a unit "i". According to the fourth document, an algorithm in which a standby state as in the second document does not occur is provided. Instead, each unit comprises a third multiplier for calculation of $t(i)$. In this calculation of $t(i)$, one unit does not require only one of all the clocks required in Montgomery multiplication (the number of clocks has the same order as word length). Thus, a hardware configuration in which throughput per circuit scale (the number of multipliers) is not optimized is provided. Further, as in the second document, redundant multiplication occurs for calculation of $t(i)$. As a result, a delay is imparted to this calculation due to pipeline process.

Further, in the second and third documents, calculation is carried out by using processing units equal to or greater than word count of a modulo N in number in order to execute Montgomery multiplication at high speed. In general, in RSA cryptosystem, a large integer such as 1024 bits is used as a size of a modulo N, and a value such as 32 bits is used as a single word length r. Therefore, in the case where ideas of the second and third documents are implemented, there is a problem that a large number of processing units are required, and a hardware is enlarged in scale concurrently. Realistically, there can occur a request for reducing the hardware scale instead of permitting the lowering of throughput to a certain extent. Namely, Montgomery multiplication must be carried out in number of processing units equal to or smaller than a word length. This can be accomplished by assigning calculation of a plurality of words to a single processing unit. However, there exists a number of dependencies such as digit round-up or integration described later between words. Therefore, there is a problem that the lowering of efficiency which is proportional to or greater than the simply reduced number of processing units occurs.

With respect to a system of carrying out Montgomery multiplication under which an integer is expressed by RNS, there is provided a system in which calculation for each base is carried out in parallel by a plurality of processing units. Reference should be made to a fifth document, "Cox-Rower Architecture for Fast Parallel Montgomery Multiplication" by S. Kawamura, M. Koike, F. Sano and A. Shimbo, Advances in Cryptology-Eurocrypt 2000, LNCS 1807, pp. 523-538, 2000."

In the system described in the fifth document, calculation of each base is processed to be distributed to a plurality of processing units. Dependency of calculation for each base is low, and thus, there is provided an advantage that, even when the number of processing units is reduced to be equal to or smaller than the number of bases, only the lowering of efficiency proportional to each reduction occurs. However, there has been a disadvantage that a ROM must be provided in each processing unit, and a circuit is enlarged in scale.

As described above, in Montgomery multiplication, although "t" is calculated by using a result of calculation in progress, it is desirable that this calculation of "t" be executed so as not to impart a delay to this calculation due to pipeline process. However, in the above described conventional technique, such an algorithm and hardware configuration are not provided. Therefore, there has been a problem that a redundant delay occurs for calculation of "t."

In the second document, each standby state occurs in two clocks in this calculation due to pipeline process for the sake of calculation of "t." Further, in the fourth document, a redundant multiplier for calculation of "t" is required for all units. Thus, there has been an algorithm and a hardware configuration in which throughput per circuit scale is not optimized.

In addition, in implementation of Montgomery multiplication, in a system using binary expression, Montgomery multiplication is implemented by an apparatus comprising processing units equal to or greater than word count of N in number. In the case of considering actual implementation, it is considered difficult to provide processing units equal to such word count in number. Thus, there is a request to reduce a hardware scale instead of permitting the lowering of a process speed to a certain extent. However, when an attempt is made to carry out Montgomery multiplication by simply reducing the number of processing units, there is a problem that the lowering of efficiency which is proportional to or greater than the reduced number of processing units occurs.

In contrast, in a system using RNS expression, dependency of calculation for each base is low. Thus, even when the number of processing units is reduced to be equal to or smaller than the number of bases, only the lowering of efficiency proportional to such reduction occurs. However, there is a disadvantage that the circuit scale per processing unit is enlarged.

BRIEF SUMMARY OF THE INVENTION

The present invention is directed to method and apparatus that substantially obviates one or more of the problems due to limitations and disadvantages of the related art.

According to a first aspect, a modular multiplication apparatus comprises a first calculation unit which comprises multiplier-adder units allocated in series in order to repeatedly perform pipeline processings, a first of the multiplier-adder units being connected to a second of the multiplier-adder units; and a second calculation unit configured to perform a calculation using an output of the first of the multiplier-adder units and an output of the second of the multiplier-adder units, a result of the calculation being supplied to the first of the multiplier-adder units as a parameter for a next calculation, whereby the first calculation unit outputs a result of repeatedly performing the pipeline processings to external.

According to a second aspect, a modular multiplication apparatus comprises a first calculation unit which comprises multiplier-adder units allocated in series in order to repeatedly perform pipeline processings based on a variable depending on an intermediate result of the pipeline processings; and a second calculation unit which includes a multiplier-adder unit which calculates the variable before the intermediate result of the pipeline processings is obtained.

According to a third aspect, a modular exponentiation apparatus for obtaining an exponential modulo $a^e$ mod N based on integers a, e, and N, comprises a modular multiplication apparatus according to the first aspect; and an output unit which compares the result output from the first calculation unit after performing the pipeline processings and the integer N, outputs a value obtained by subtracting the integer N from the result when the result is not smaller than the integer N, and outputs the result when the result is smaller than the integer N.

According to a fourth aspect, a modular multiplication method comprises performing a modular multiplication by repeatedly performing pipeline processings by using multiplier-adder units, a first of the multiplier-adder units being connected to a second of the multiplier-adder units; and performing a calculation using an output of the first of the multiplier-adder units and an output of the second of the multiplier-adder units before one of the pipeline processings is performed and supplying a result of the calculation to the first of the multiplier-adder units at a start of the one of the pipeline processings is performed.

According to a fifth aspect, a modular multiplication method comprises performing a modular multiplication by repeatedly performing pipeline processings by using processing units each including a multiplier-adder unit based on a variable depending on an intermediate result of the pipeline processings; and calculating the variable before the intermediate result of the pipeline processings is obtained by using a calculation unit which includes a multiplier-adder unit.

According to a sixth aspect, a modular multiplication apparatus comprises a first calculation unit which comprises multiplier-adder units allocated in series in order to repeatedly perform pipeline processings; and a control unit configured to control the pipeline processings according to a modulo size of a modular multiplication and the number of the multiplier-adder units.

According to a seventh aspect, a modular exponentiation apparatus for obtaining an exponential modulo $a^e$ mod N based on integers a, e, and N, comprises a modular multiplication apparatus according to the sixth aspect; and an output unit which compares a result of the pipeline processings and the integer N, outputs a value obtained by subtracting the integer N from the result when the result is not smaller than the integer N, and outputs the result when the result is smaller than the integer N.

According to an eighth aspect, a modular multiplication method comprises performing a modular multiplication by repeatedly performing pipeline processings by using multiplier-adder units; assigning several contiguous words of a target operator from a lowest-order multiplier-adder unit according to the modulo size and the number of the multiplier-adder units such that a load of each of the multiplier-adder units is made substantially uniform; and alternatively executing two sets of different multiplications in the modular multiplication, the number of the multiplications in each set being according to the modulo size and the number of the multiplier-adder units.

According to a ninth aspect, a modular multiplication method comprises performing a modular multiplication by carrying out pipeline processings by multiplier-adder units; assigning several contiguous words of a target operator from a lowest-order multiplier-adder unit according to the modulo size and the number of the multiplier-adder units such that a load of each of the multiplier-adder units is made substantially uniform; and supplying the target operator to the multiplier-adder units so as to make digit adjustment during the pipeline processings.

BRIEF DESCRIPTION OF THE SEVERAL VIEWS OF THE DRAWING

FIG. 5 is a functional block diagram showing a modular multiplication apparatus 14 according to the first embodiment;

FIG. 8A and FIG. 8B are diagrams each showing a configuration and a process of a calculation unit 31 according to the first embodiment;

FIG. 12A and FIG. 12B are diagrams each showing a configuration of a calculation unit 31 according to the third embodiment;

FIG. 15 is a diagram showing a configuration of a calculation unit 31 according to the fourth embodiment;

FIG. 16 is a diagram showing a configuration of a t-calculation unit 40 according to the fourth embodiment;

FIG. 21 is a diagram showing a configuration of the calculation unit 141 at the most significant bit according to the seventh embodiment;

DETAILED DESCRIPTION OF THE INVENTION

An embodiment of a modular multiplication apparatus, a modular multiplication method, and a modular exponentiation apparatus according to the present invention will now be described with reference to the accompanying drawings.

FIRST EMBODIMENT

Figure 1:
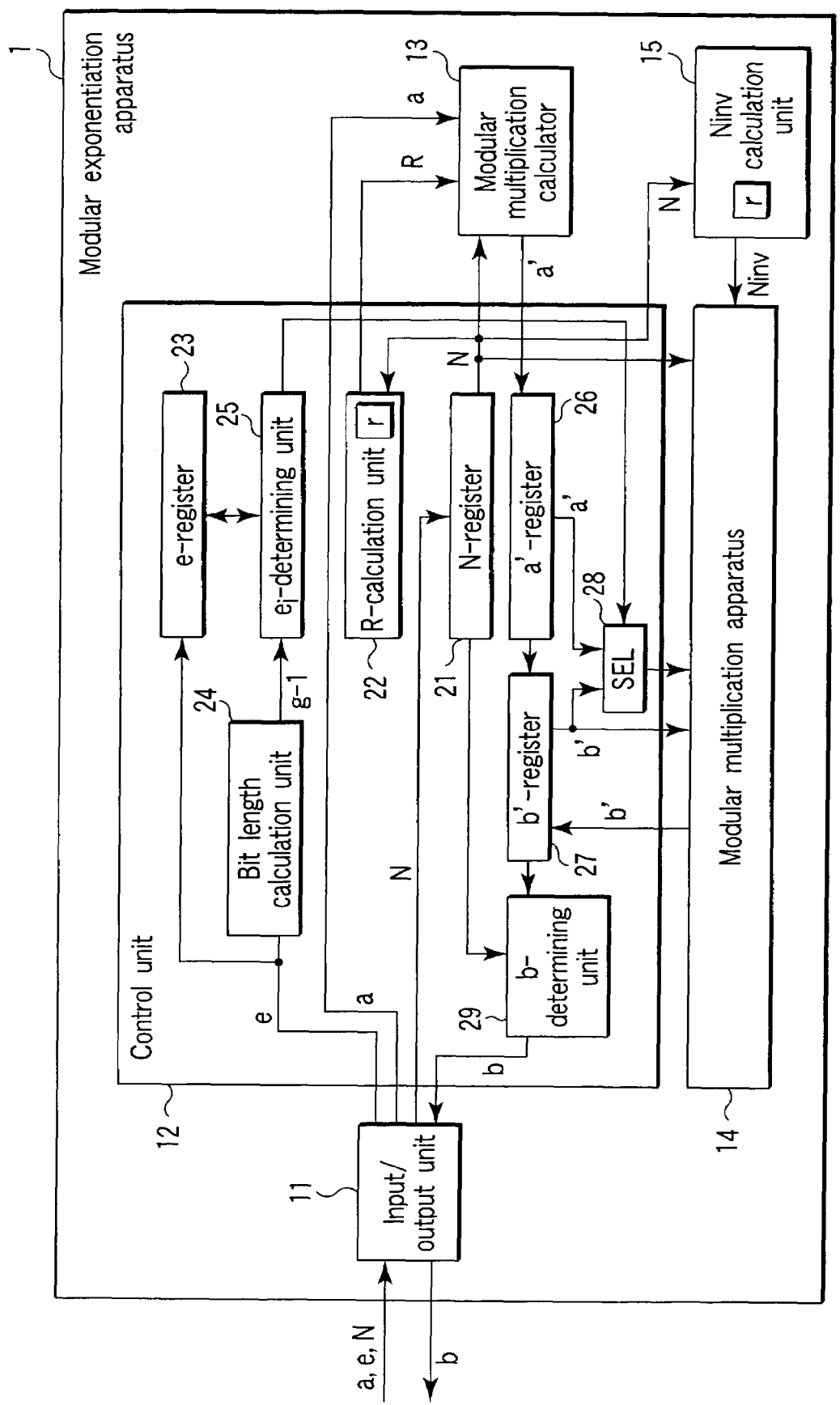
FIG. 1 is a functional block diagram showing a modular exponentiation apparatus 1 according to a first embodiment of the present invention.

FIG. 1 is a diagram showing a configuration of a modular exponentiation apparatus according to a first embodiment of the present invention.

In a number of public key cryptosystems such as RSA cryptosystems, in its process, modular exponentiation of $b=a^e$ mod N (b, a, e are integers) is used. Modular exponentiation of $b=a^e$ mod N is implemented by repetition of modular multiplication. In addition, Montgomery multiplication is known as a substitutive calculation technique of modular multiplication. Montgomery multiplication outputs $w=xyR^{-1}$ mod N or $w=xyR^{-1}$ mod N+N (i.e., w<2N) to an input of integers x, y, N (x<N, y<N), and is calculated by $w=(xy+N [xy(-N^{-1})$ mod $R])/R$. R is called Montgomery constant, and is an arbitrary integer which meets R>N, gcd(R, N)=1. "gcd" denotes the greatest common divisor. In general, R is selected such that modular multiplication and dividing are simplified. In binary expression, R is taken for a "power" of 2, whereby modular multiplication is achieved by high-order bit truncation, and dividing is achieved by shift calculation.

With respect to a method for carrying out modular exponentiation by repeatedly using Montgomery multiplication, there is known a technique such as a binary technique or a window technique. Here, as an example, there is shown an algorithm of modular exponentiation of $b=a^e$ mod N using a binary technique.

A modular exponentiation algorithm using a binary technique is as follows.

a'=aR mod N
   b'=a'
      for i=g-1, . . . , 1
   b'=MM(b', b', N)
      if $e_i$=1, b'=MM(b', a', N)
      next i
   b'=MM(b', 1, N)
      if b'≧N, b=b'-N
      else b=b' where g denotes a bit length of e, and $e_i$ denotes a value of i-th bit. The most significant bit $e_g$ is defined as 1. MM(x, y, N) denotes Montgomery multiplication $(xy+N [xy(-N^{-1})$ mod $R])/R$.

FIG. 1 is a functional block diagram showing a modular exponentiation apparatus for executing a modular exponentiation algorithm using the above-described binary technique.

An input/output unit 11 is an interface that inputs or outputs data relevant from or to an external device, for example a personal computer, of a modular exponentiation apparatus 1. This interface externally inputs a, e, N, and externally outputs a calculation result b to these inputs.

A control unit 12 governs the whole control of the modular exponentiation apparatus 1, and controls individual portions in the apparatus 1 based on the modular exponentiation algorithm using a binary technique. The control unit 12 comprises an N register 21 which stores an input N from the input/output unit 11 and an R calculation unit 22 which calculates Montgomery constant R based on word width r bits (a device fixed value) of this modular exponentiation apparatus 1. The word width r (bits) is stored in the R calculation unit 22. The control unit 12 further comprises an e-register 23 which stores an exponent e input from the input/output unit 11; a bit length calculation unit 24 which obtains a bit length g of the input exponent e, and outputs a value obtained by subtracting 1 from the bit length g as an initial value; and an $e_i$-determining unit 25 which determines whether or not an i-th bit is 1 ($e_i$=1) by counting down the initial value i from the bit length calculation unit 24 one by one, and referring to the exponent e stored in the e-register 23.

The control unit 12 further comprises an a'-register 26 which stores a' from a modular multiplication calculator 13 described later; b'-register 27 which stores b' calculated by a modular multiplication apparatus 14 described later so as to be updated while a' is defined as an initial value; a selector 28 which selectively outputs to the modular multiplication apparatus 14 the a' or b' stored in the a'-register 26 or b'-register 27 based on a result of the $e_i$-determining unit 25. The control unit 12 further comprises a b-determining unit 29 which determines a relationship between the calculation result b' and the N stored in the N-register 21 when the calculation result of MM(b', 1, N) calculated by the modular multiplication apparatus 14 is stored in the b'-register 27, which takes a value obtained by subtracting N from b' as a calculation result b when b'≧N is determined, and which takes b' as b when it is not b≧N to output the result to the input/output unit 11.

The Modular multiplication calculator 13 performs modular multiplication. This calculator 13 carries out modular multiplication of a'=aR mod N by "a" from the input/output unit 11, N from the N-register 21, and Montgomery constant R calculated by the R-calculation unit 22, and obtains a'.

The modular multiplication apparatus 14 inputs N from the N-register 21 and b' from the b'-register 27, and repeatedly uses product-sum operation to obtain new b' (=MM(b', b', N)). When $e_i$=1, the modular multiplication apparatus 14 inputs N from the N-register 21, b' from the b'-register 27, and a' from the a'-register 26, and repeatedly use a product-sum operation to obtain new b' (=MM(b', a', N)). Further, the modular multiplication apparatus 14 inputs N from the N-register 21 and b' from the b'-register 27, and repeatedly uses product-sum operation to obtain new b' (=MM(b', 1, N)). The obtained new b' is output to the b'-register 27, and the b'-register 27 is updated. In the present embodiment, calculation concerning Montgomery constant R in Montgomery multiplication is achieved as round-down of the lower significant (n+1) word (n is word count of modulo N as described later). Thus, there is no need to handle data R itself by the modular multiplication apparatus 14. In FIG. 1, explicit input of R to the modular multiplication apparatus 14 is omitted. An inside of the modular multiplication apparatus 14 will be described later in detail.

An $N_{inv}$ calculation unit 15 carries out modular multiplication of $-N^{-1}$ mod $2^r$ or $-N(0)^{-1}$ mod $2^r$ by N from the N-register 21 and a word width r (bits) (device fixed value) of the modular exponentiation apparatus 1 provided inside of the Ninv calculation unit 15 as in the R-calculation unit 22, and obtains $N_{inv}$.

The modular exponentiation apparatus 1 according to the present embodiment has been configured above without being limited thereto. For example, a subtracting unit which carries out subtraction of −1 may be provided instead of the bit length calculation unit 24 by calculating a bit length of "e" outside of the modular exponentiation apparatus 1, and then, imparting the calculated bit length to the modular exponentiation apparatus 1. In addition, an R-register which stores R may be provided instead of the R-calculation unit 22 by calculating Montgomery constant R outside of the modular exponentiation apparatus 1, and then, imparting the calculated constant to the modular exponentiation apparatus 1. Further, when the window technique is applied, it is a matter of course that another configured modular exponentiation apparatus is provided. In other words, any configuration may be provided so long as a proper variable is imparted to the modular multiplication apparatus 14.

A detailed description will be given with respect to a modular multiplication apparatus 14 according to the present embodiment. Some supplemental descriptions will be given before describing a configuration of a functional block of the modular multiplication apparatus 14 which carries out Montgomery multiplication.

First, a description will be given with respect to cardinal number expression of an integer. In the case where a cardinal number is defined as $2^r$, an integer x can be expressed as in the following equation:

$$x=x(0)+x(1)\cdot 2^r+x(2)\cdot 2^{2r}+\ldots +x(m-1)\cdot 2^{(m-1)r}$$

where m is a word length of x in the case where one word is defined as r bits, x(i) is an i-th word, x(0) is the least significant bit word, and x(m−1) is the most significant bit word. Namely, the integer x can be handled as x(0), x(1), x(2), ..., x(m−1). Other integers such as y, N and w can also be handled in the same manner. A basic calculation bit width of the modular multiplication apparatus 14 described later coincides with a bit width r of one word based on this cardinal number expression.

Next, Montgomery constant which meets R≧4N is employed. An output of Montgomery multiplication to an input x (<2N), y (<2N) is obtained as w (<2N). Therefore, when Montgomery multiplication is repeatedly executed, it is possible to use the obtained calculation result w intact as input data x, y of next Montgomery calculation. A condition for a variable of Montgomery multiplication in the present embodiment is as follows.

Modulo N: n words (a word width is r bits), odd number when gcd(R, N)=1
Montgomery constant: $R=2^{(n+1)r}$ (r≧2)
Input data: x (<2N), y (<2N)
Output data: w (<2N)
Montgomery multiplication w=(xy+N[xy($-N^{-1}$) mod R])/R described previously is placed as t=xy($-N^{-1}$) mod R, whereby executing Montgomery multiplication w=(xy+Nt)/R can be expressed. Montgomery multiplication based on cardinal number expression can be carried out in accordance with the following algorithm:
w=0
for j=0, ..., n
w=w+xy(j)
t(j)=w(0) $N_{inv}$ mod $2^r$
w=(w+Nt(j))/$2^r$
next j
where $N_{inv}$ is a value calculated in advance in accordance with the following equation.

$$N_{inv}=-N^{-1} mod 2^r=-N(0)^{-1} mod 2r \qquad (1)$$

Figure 2:
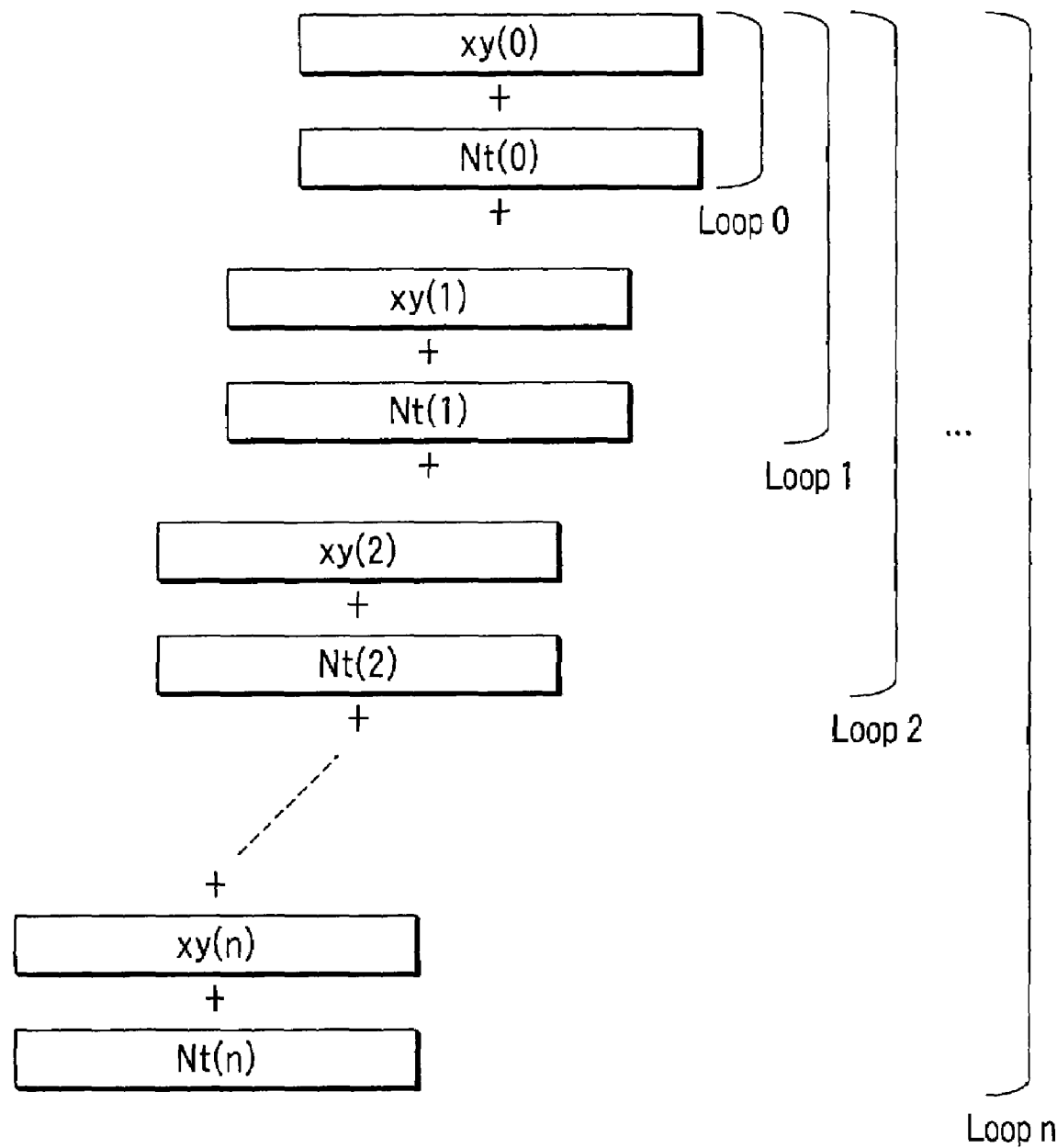
FIG. 2 is a diagram showing process of Montgomery multiplication algorithm.

The above Montgomery multiplication algorithm carries out repetition process of simple multiplying and adding as shown in FIG. 2. Namely, in loop j, xy(j) and Nt(j) are obtained, and a process for obtaining a sum of all xy(k), Nt(k) (k=0, . . . j−1) obtained up to loop j−1 is carried out (although it is not shown, dividing by $2^r$ is carried out). Left-shifting a group of xy(j) and Nt(j) in ascending order is due to cardinal number expression.

Figure 3:
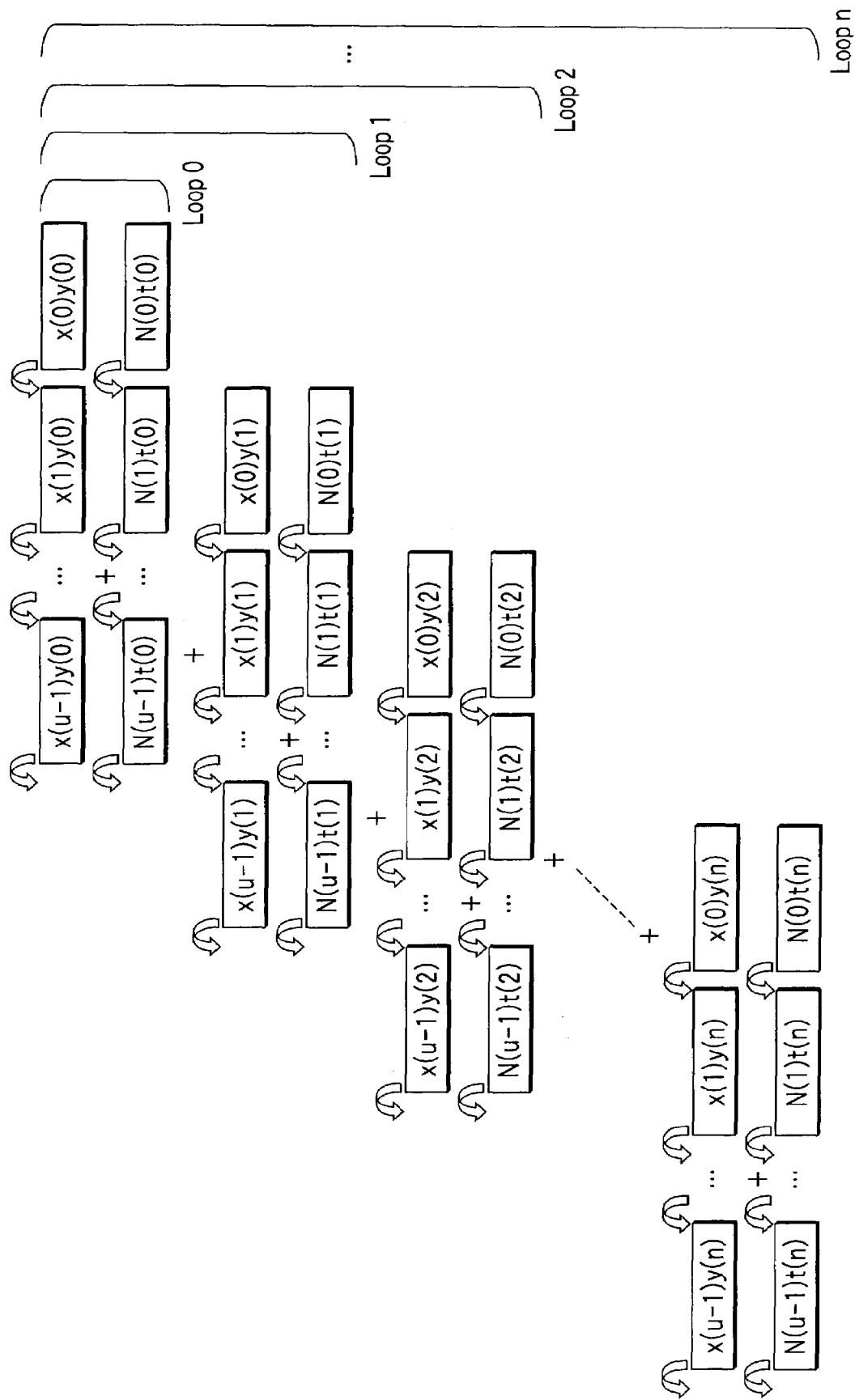
FIG. 3 is a diagram showing processing when the process of FIG. 2 is divided into units of words.

In the meantime, when the above Montgomery multiplication algorithm is implemented in parallel as hardware, Montgomery multiplication is divided into multiplication in units of words, and calculation and execution in each unit is carried out. This Montgomery algorithm in units of words is shown in FIG. 3 where the number of divisions is "u." At this time, as a result of calculation in each divisional unit (each cell in FIG. 3), a digit round-up occurs (carry: indicated by the arrow of FIG. 3), and thus, multiplication in each unit for the same line (a line in which "j" is identical) cannot be carried out at the same time. Namely, there occurs necessity of sequentially calculating from a low-order unit to a high-order unit.

Figures 4, 7:
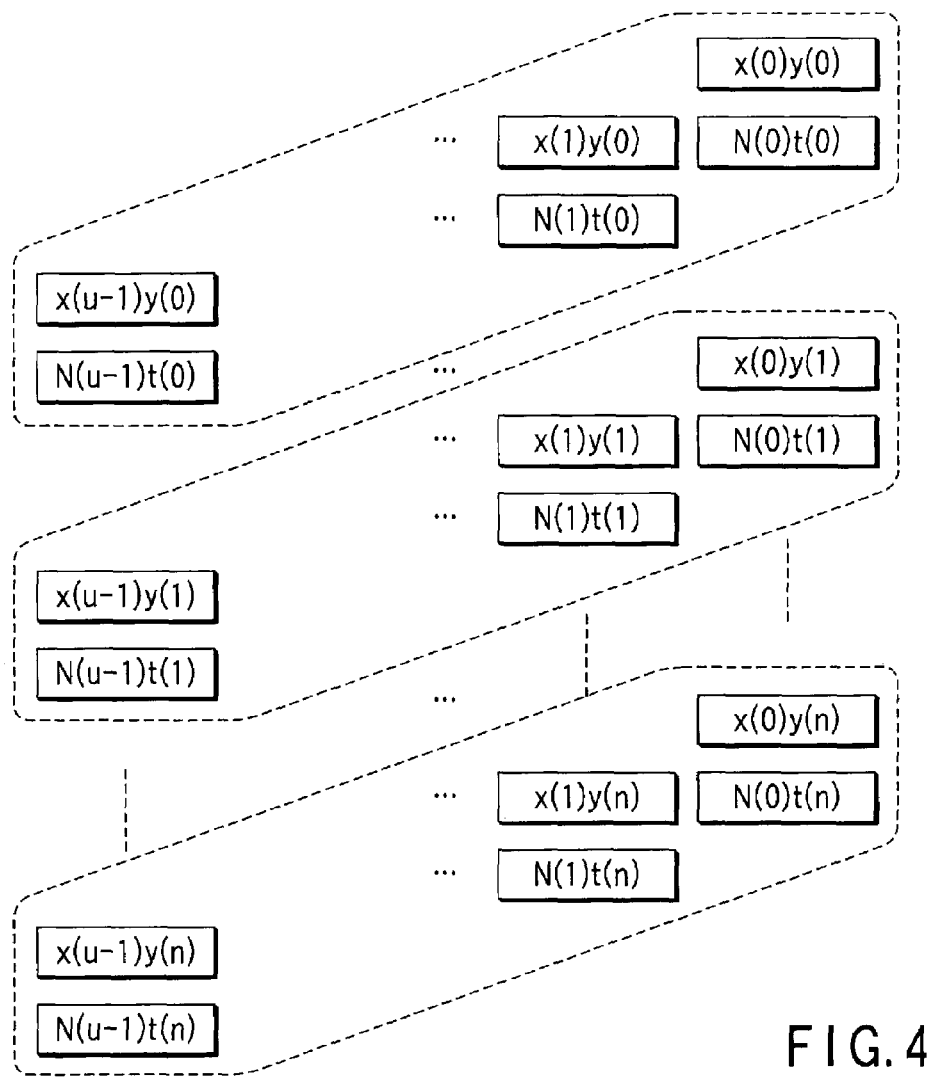
FIG. 4 is a diagram showing processing when the process of FIG. 3 is handled in pipeline.
FIG. 7 is a diagram showing dependency of a result of calculation of a variable "t" in progress in Montgomery multiplication.

In the modular multiplication apparatus 14, u processing units (hereinafter, referred to as "units", and represented as unit 0 to unit u−1) are provided, and a process is carried out while sequentially shifting between the units from the low-order unit to the high-order unit. Hereinafter, this process is referred to as pipeline process. Process of the Montgomery multiplication algorithm in accordance with the pipeline process is carried out as shown in FIG. 4, and calculation can be sequentially carried out without a delay in each pipeline process.

Although the round-up of the most significant bit in each pipeline process affects the final stage of next pipeline process, the final stage of the next pipeline process is carried out at the next timing during round-up. Thus, no timing problem occurs.

However, in each pipeline process, although t(j) is obtained by using part of a calculation result made in a previous pipeline process, predetermined calculation (described later) required to obtain the t(j) is so slow that a delay occurs.

Because of this, in the modular multiplication apparatus 14 according to the present embodiment, a process for obtaining t(j) in advance is additionally provided so as to eliminate a delay between pipelines.

FIG. 5 is a functional block diagram showing the modular multiplication apparatus 14 according to the present embodiment in which the process for obtaining t(j) in advance is provided.

The modular multiplication apparatus 14 comprises: a main calculation unit 30 comprising u pipeline process units 31 each having one multiplier-adder unit 32; one t-calculation unit 40 having one multiplier-adder unit 41; and a carry process unit 50 which processes round-up generated at a (u−1)-th unit 31. The modular multiplication apparatus 14 thus configured inputs b', a'/b' and N, obtains new b', and outputs it. Alternatively, the apparatus 14 inputs b', N, obtains new b', and outputs it. Although it is not shown in particular, the "u" pipeline process units 31 may comprise a RAM or a ROM individually as required, or the main calculating apparatus 30 may comprise such a RAM or ROM in all. Further, although it is not shown in particular, the t-calculation unit 40 may share RAM or ROM with the main calculation unit 30, or may be comprise RAM or ROM independently of the main calculation unit 30. In addition, the carry process unit 50 may be substituted by providing a pipeline calculation unit 31.

In the case where RSA process for a key length 1024 bits is executed by a circuit of a calculating bit width 32, specific values of r, n, u are obtained as r=32, n=32, u (=n+1)=33 according to the present embodiment.

Now, Montgomery multiplication algorithm applied in the present embodiment will be described before describing a construction of each unit 31 and the t-calculation unit 40.

In the present embodiment, a description will be given with respect to a case in which a relationship between the number of units "u" and "n" is u=n+1. This u (=n+1) is the minimal number of units which achieves its maximal performance relevant to "n." A condition for u≧2 is defined in accordance with an algorithm of the t-calculation unit 40.

Montgomery multiplication algorithm applied in the first embodiment is as follows.

Process of Unit i (31)
  C(x(1−i)y(j))=0, C(N(i−1)t(j))=0
  (for i=0 & j=0, . . . , n)
  M(N(i+1)t(−1))=0
  for j=0, . . . , n
  Step 1: C(x(i)y(j))∥M(x(i)y(j))=x(i)y(j)+C(x(i−1)y(j))+M(N(i+1)t(j−1)) . . . clock i+2j
  Step 2: C(N(i)t(j))∥M(N(i)t(j))=N(i)t(j)+C(N(i−1)t(j))+M(x(i)y(j)) . . . clock i+2j+1
  next j Process of t-calculation unit 40
  t(−1)=0, C(N(0)t(−1))=0, M(x(1)y(−1))=0
  for j=0, . . . , n
  Step 1: v(j)=L(N(1)t(j−1)+x(0)y(j)) . . . clock 2j−1
  Step 2: t(j)=L(NinvL(v(j)+C(N(0)t(j−1))+M(x(1)y(j−1)) . . . clock 2j
  next j Process of carry process unit 50
  for j=0, . . . , n
  Step 1: M(x(n+1)y(j))=C(x(n)y(j) . . . clock n+2j+1
  Step 2: M(N(n+1)t(j))=C(N(n)t(j))+M(x(n+1)y(j)) . . . clock n+2j+2
  next j In the foregoing, expression of C∥M=(right side) designates that, in the case where a bit length of a calculation result of right side is r+r', the lower r bits of the right side calculation result are defined as M, and the upper r' bits are defined as C. That is, M denotes a sum of digits when such calculation is carried out, and C denotes a round-up (carry). In the above algorithm, the maximal bit length of a round-up is defined as r, and the upper r bits are defined as C. In addition, L(A) designates the lower r bits.

Figure 6:
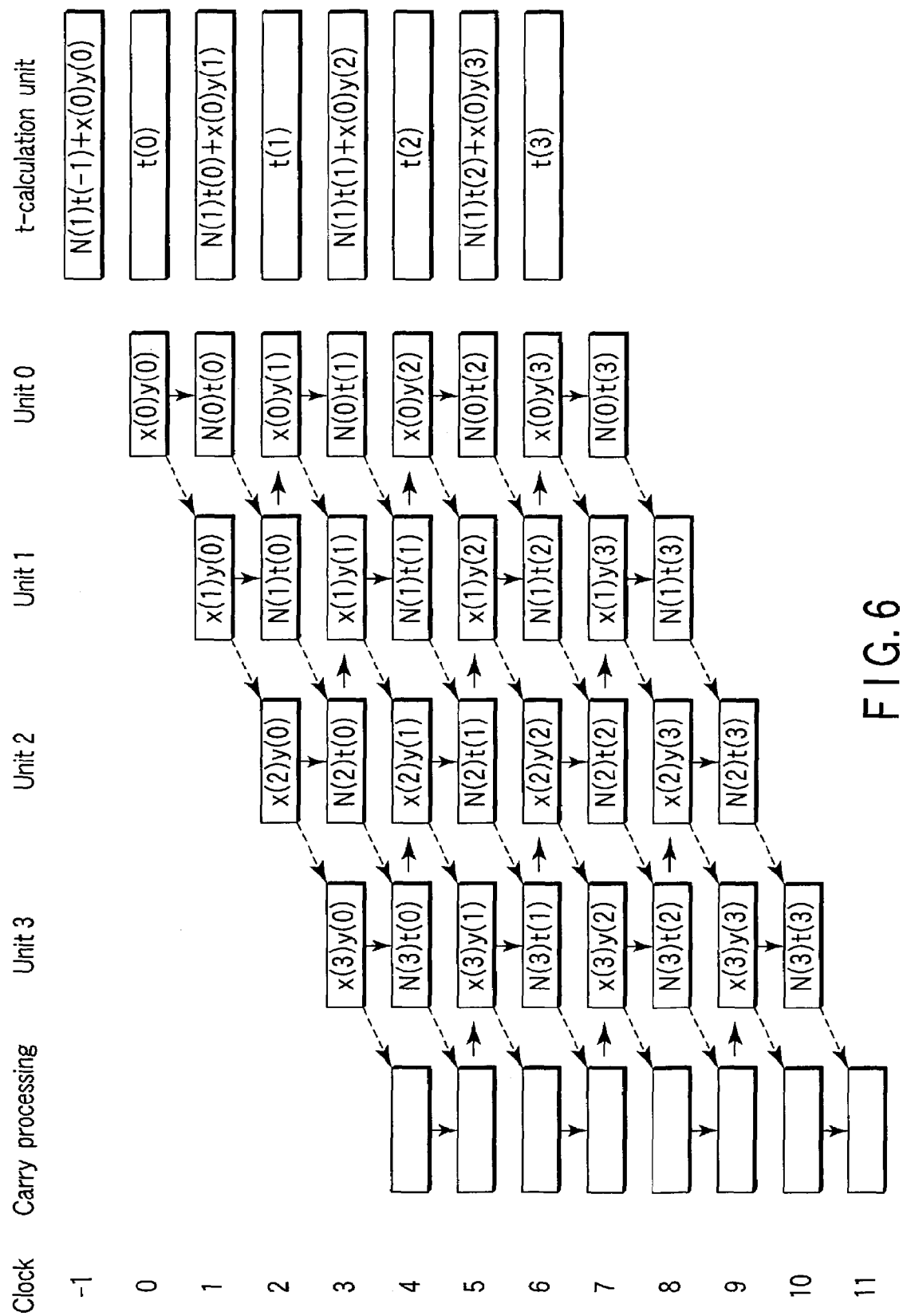
FIG. 6 is a diagram showing a flow of pipeline process according to the first embodiment.

FIG. 6 shows a specific example of flow of pipeline process in accordance with Montgomery multiplication algorithm applied in the first embodiment in the case of n=3, u (=n+1)=4. The figure shows what clock of what unit executes multiplication in units of words. In addition, the arrow indicated by solid line indicates what unit is targeted for inputting a calculated sum (M(x(i)y(j)) or M(N(i)t(j)), or the arrow indicated by dotted line indicates what unit is targeted for inputting round-up (C(x(i)y(j)) or C(N(i)t(j)). FIG. 6 also shows a process at the t-calculation unit 40 altogether.

Now, a detailed description will be given with respect to Montgomery multiplication algorithm applied in the first embodiment.

First, in process of the unit i (31), C(x(i)y(j)) and M(x(i)y(j)) in step 1 are calculated at clock i+2j, and C(N(i)t(j)) and M(N(i)t(j)) in step 2 are calculated at clock i+2j+1. At this time, in input data in step 1, C(x(i−1)y(j)) is calculated by the unit i−1 before one clock, and M(N(i+1)t(j−1)) is calculated by the unit i+1 during the same clock. In step 2, C(N(i−1)t(j)) is calculated by the unit i−1 before one clock, and M(x(i)y(j)) is calculated by the unit i before one clock. In step 2, t(j) is also data which is determined depending on a result of calculation in progress, and the calculation process is carried out as follows in accordance with process of the t-calculation unit 40.

In process of the t-calculation unit 40, v(j) in step 1 is calculated by clock 2j−1, and t(j) in step 2 is calculated by clock 2j. A reason why such two-step process is carried out is as follows. Multiplication using t(j) is first executed in pipeline process in unit 0 of clock 2j+1 (refer to FIG. 6). Assume that (a) calculation of t(j) is completed at clock 2j before one clock so as to be in time for such multiplication and (b) a delay in one clock (critical path) is suppressed to (one multiplier+one adder) which is equal to or smaller than the longest path of this calculation in accordance with pipeline process. At this time, the dependency of t(j) with respect to a result of calculation in process must be considered as follows.

According to Montgomery multiplication algorithm applied in the first embodiment described previously, t(j) is calculated from w(0). w(0) is the least significant bit word of an intermediate result w, and w(0) for use in calculation of t(j) is assigned in the following equation:

$$w(0)=L([z(0)+ \ldots +z(j-1)+x(0)y(j)]/2jr)$$

$$z(h)=[x(0)y(h)+N(0)t(h)]2^{hr}+ \ldots +[x(h')y(h)+N(h')t(h)]2^{(h+r')r}$$

where h=0, . . . , j−1, h'=j−h. As an example, a case of n=3 is shown in FIG. 7. For example, the above w(0) for use in calculation of t(2) is assigned as a sum considering digit adjustment and digit roundup of each multiplication enclosed in thick line in the figure. That is, in order to calculate t(j), it is required that the multiplying operations included in the above equation and summing calculation of these operations are executed in advance.

According to the above dependency, in the multiplication required for calculation of t(j), the calculation executed in the slowest clock of pipeline process is N(1)t(j−1) and x(0)y(j) (refer to FIG. 6). These calculations are carried out by unit 1 and unit 0, respectively. However, the timing is clock 2j, and thus, if an attempt is made to execute these calculations at the t-calculation unit 40, the above conditions (a) and (b) cannot be met.

In order to solve this problem, these two multiplying operations are carried out in advance at the t-calculation unit 40 in process of the t-calculation unit 40 according to the present embodiment. At this time, such advanced calculations are executed as step 1 before one clock of step 2, thereby making it possible to meet the above conditions (a) and (b) at the same time. Apart from N(1)t(j−1) and x(0)y(j), all the multiplying operations required for calculation of t(j) are carried out up to clock 2j−1, and they are obtained as C(N(0)t(j−1)) and M(x(1)y(j−1)) respectively at clock 2j−1 of unit 0 and unit 1. Therefore, these calculation results are received from unit 0 and unit 1 at clock 2j, thereby making it possible to execute step 2 without any problem.

In this first embodiment, the number of units "u" is defined as u=n+1. Therefore, there does not exist a unit in which carries C (x(n)y(j)) and C(N(n)t(j)) should be passed to the most significant bit unit, and it is required to carry out process of these carries. This process is carried out at the above carry process unit 50. First, step 1 is executed at clock n+2j+1, C(x(n)y(j)) calculated before one clock is received from unit "n," and the received data is defined as M(x(n+1)y(j)). Next, step 2 is executed at clock n+2j+2, C(N(n)t(j)) calculated before one clock is received from unit "n," adding operation relevant to M(x(n+1)y(j)) is carried out, and M(N(n+1)t(j)) is obtained. This M(N(n+1)t(j)) is input to unit "n" in the same clock, and the input data is used as input data in step 1 in process of the unit i.

w(i)=M(N(i+1)t(n)) (i=0, . . . , n) is obtained as a calculation result w (<2N) of Montgomery multiplication by executing Montgomery multiplication algorithm applied in the first embodiment.

In pipeline process, when process of a first unit ends, a next process can be started even if process of another unit does not end. In the present embodiment, the clock count required for one unit to execute Montgomery multiplication is referred to as a pipeline period. Therefore, the processing time for modular exponentiation is determined in proportion to this pipeline period. The pipeline period in accordance with Montgomery multiplication algorithm applied in the first embodiment is 2(n+1)+ϵ. Here, ϵ is a sufficiently small value as compared with n. ϵ=2 is defined in the case of the first embodiment.

Hereinafter, a detailed description will be given with respect to a configuration and operation of the modular multiplication apparatus 14 to which the above described algorithm is applied.

FIG. 8A and FIG. 8B each show a configuration of each unit i(31) and a process thereof.

Each unit i(31) according to the present embodiment is shown respectively to be divided into FIG. 8A and FIG. 8B because two types of processes exist according to a clock. The dotted line designates that the path is not selected in that clock. Each unit i comprises three registers R1, R2, and R3, a selector SEL, a multiplier 34, and an adder 35.

FIG. 8A shows a process at clock i+2j. This operation corresponds to step 1 in process of the unit i. To the unit i, y(j) and C(x(i−1)y(j)) is input from the unit i−1, and M(N(i+1)t(j−1)) is input from the unit i+1. x(i) may be in accordance with a system for storing it to be distributed in a register or RAM or may be in accordance with a system for storing x(i) (i=0, . . . n) in the entire apparatus in batch. In the unit i at clock i+2j, x(i)y(j)+C(x(i−1)y(j)+M(N(i+1)t(i−1)) is calculated, the lower r bits are stored as M(x(i)y(j)) in the register R1, and the residual upper bits are stored as C(x(i)y(j)) in the register R2. Further, y(j) is stored in register R3. From the unit i, C(N(i)t(j−1) stored in the register R2 at clock i+2j−1 before one clock and t(j−1) stored in the register R3 are output, and are input to the unit i+1.

FIG. 8B shows a process at clock i+2j+1.

This operation corresponds to step 2 in process of the unit i. To the unit i, t(j) and C(N(i−1)t(j)) are input from the unit i−1. N(i) may be in accordance with a system for storing it to be distributed in a register or RAM which each unit has or may be in accordance with a system for storing N(i) (i=0, . . . , n) in the entire apparatus in batch. In the unit i at clock i+2j+1, N(i)t(j)+C(N(i−1)t(j))+M(x(i)y(j)) is calculated. At this time, M(x(i)y(j)) is a value stored in the register R1 at clock i+2j. Then, the lower r bits are input as M(N(i)t(j)) in the unit i−1, and the residual upper bits are stored as C(N(i)t(j)) in the register R2. t(j) is stored in the register R3. The outputs from the unit i are M(N(i)t(j)) of a result of multiplying and adding, C(x(i)y(j) stored in the register R2 at clock i+2j, and y(j) stored in the register R3. These outputs are input to the unit i−1 or the unit i+1.

y(j) and t(j) are used alternately for each clock. Thus, although FIG. 8A and FIG. 8B show a configuration when the register R3 is shared, there may be employed a system for providing a register or wire to y(j) and t(j), respectively. In addition, unlike FIG. 8A and FIG. 8B, instead of a configuration in which all the outputs from the multiplier are input to the adder, there may be employed a configuration in which only the lower r bits are input to the adder, the residual upper bits are stored as C'(x(i)y(j)) (C'(N(i)t(j) in the lower-step process) in a register R2' newly provided, and it is added to an adder of the unit i+1. In this case, although one input to the adder increases, it is possible to reduce a bit width of the adder.

Figure 9:
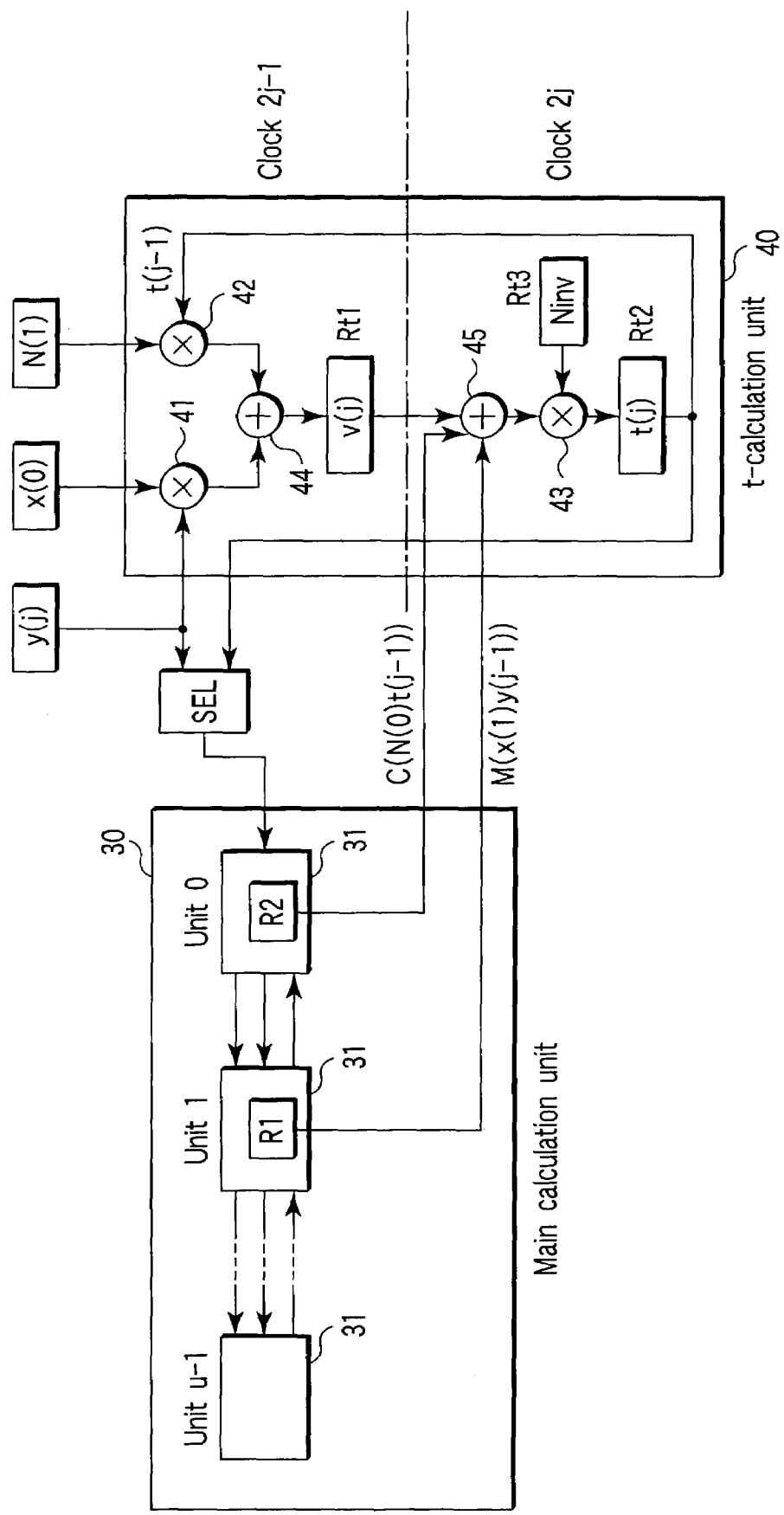
FIG. 9 is a diagram showing a configuration and a process of a t-calculation unit 40 according to the first embodiment.

Now, a configuration and process of the t-calculation unit 40 will be described with reference to FIG. 9. In the figure, there is also shown a connection between the t-calculation unit 40 and the main calculation unit 30. The t-calculation unit 40 comprises three registers Rt1, Rt2, and Rt3, three multipliers 41, 42, and 43, and two adders 44 and 45. First, x(0), N(1) and y(j) are input to the t-calculation unit 40 at clock 2j−1. x(0) and N(j) must not be always newly maintained for the t-calculation unit 40, and it is possible to share data maintained for the above described unit. In addition, y(i) (i=0, . . . , n) may be in accordance with a system for storing it to be distributed in a register or RAM which each unit has, in the same manner as in x(i) or N(i) or may be in accordance with a system for storing it in the entire apparatus in batch.

Using the above input data, the t-calculation unit 40 of clock 2j−1 calculates v(j)=L(N(1)t(j−1)+x(0)y(j)), and stores it in the register Rt1. Here, t(j−1) is a value stored in the register R2 at clock 2j−2. Next, at clock 2j, t(j)=NinvL (v(j)+C(N(0)t(j−1))+M(x(1)y(j−1))) is calculated, and is stored in the register Rt2. Here, C(N(0)t(j−1)) is a value stored in the register R2 of unit 0 at clock 2j−1, and M(x(1)y(j−1)) is a value stored in the register R1 of unit 1 at clock 2j−1.

$N_{inv}$ is a value which is calculated in advance at an $N_{inv}$ calculation unit 15 in accordance with the above equation (1), and which is stored in a register or RAM. When t(j) is calculated at the t-calculation unit 40 at clock 2j, t(j) is input to unit 0 in the subsequent clock 2j+1, and is used for process of the unit i. In each unit, y(j) and t(j) are used alternately for each clock. Thus, although FIG. 9 shows a construction in which y(j) and t(j) are input to unit 0(31) by selecting one of them by a selector, there may be employed a configuration in which y(j) and t(j) are input independently.

Figure 10A:
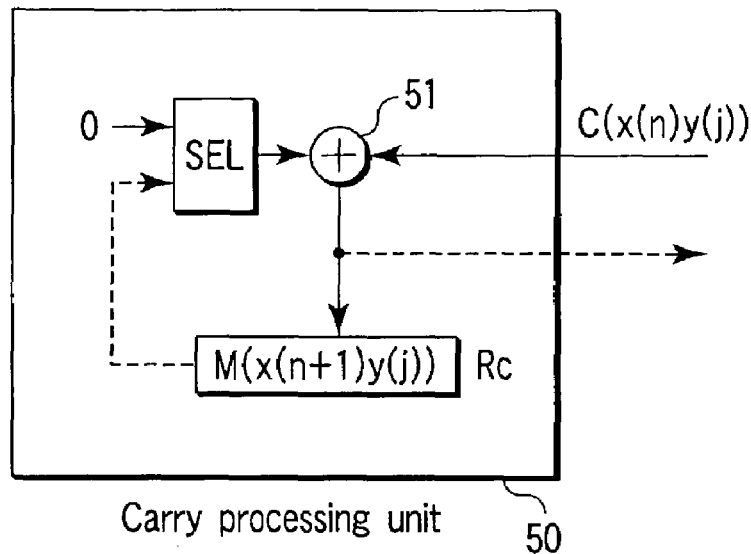
FIG. 10A and FIG. 10B are diagrams each showing a configuration and a process of a carry process unit 50 according to the first embodiment.
Figure 10B:
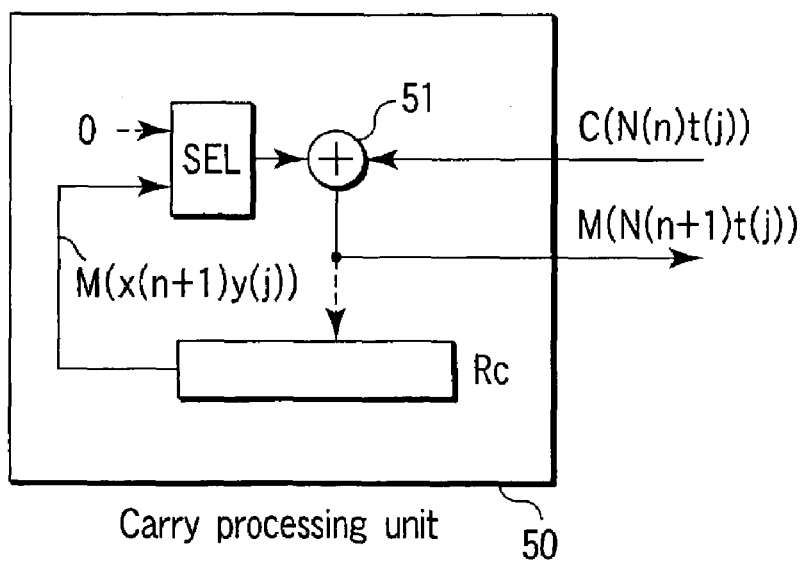

Lastly, a configuration and process of the carry process unit will be described with reference to FIG. 10A and FIG. 10B.

The carry process unit 50 comprises one adder 51, one register $R_C$, and one selector SEL. As shown in FIG. 10A, at clock n+2j+1, C(x(n)y(j)) from unit u−1 is written in register $R_C$. As shown in FIG. 10B, at clock n+2j+2, C(N(n)t(j)) from unit u−1 is added to value M(x(n+1)y(j)) of the register $R_C$, and M(N(n+1)t(j)) is supplied to unit u−1.

The carry process unit 50 is small in circuit scale as compared with each unit 31 of the main calculation unit 30; a calculation bit width can be reduced as compared with r of each unit 31; and its process is a simple process (part of process of the unit i) which is defined in accordance with process of the unit i. Here, although the carry process unit 50 has been provided apart from u units, there may be employed a system for incorporating something into the most significant bit unit u−1 instead of the carry process unit 50. In addition, there may be employed a system for defining u=n+2 by increasing the number of units by one, and carrying out process of the carry process unit in the most significant bit unit n+1.

A critical path in a hardware configuration according to the present embodiment, the critical path being configured and operating as described above will be described with reference to FIG. 8.

In the critical path, a calculation result M(N(i)t(j)) through the multiplier and the adder at clock i+2j+1 of the unit i is input to the unit i−1, and the input is written in the register R1 through the adder at clock (i−1)+2j+2 of the unit i−1. That is, a critical path for Montgomery multiplication according to the present embodiment is configured as (one multiplier+two adders). On the other hand, the longest path in accordance with t-calculation is configured as (one multiplier+one adder). In Montgomery multiplication according to the present embodiment, a delay due to t-calculation does not occur, and a critical path is determined depending on this calculation in the main calculation unit 30.

When the hardware scale according to the present embodiment is estimated based on the number of multipliers, the main calculation unit 30 has (1×u) multiplies, and the t-calculation unit 40 has three multipliers. The multiplier is remarkably large in its circuit scale as compared with the adder, register, selector and the like, and thus, such an estimation is considered to be reasonable.

The modular multiplication apparatus 14 according to the present embodiment enables more efficient process for modular exponentiation by about two times, as compared with a conventional technique disclosed in the second document (Walter. et al). Further, a critical path is shorter by one multiplier (an effect of delay due to a multiplier is greater than that of an adder), thus enabling process at a high operating frequency.

Similarly, the modular multiplication apparatus 14 according to the present embodiment enables more efficient process for modular exponentiation by about three times, as compared with a conventional technique disclosed in the fourth document. In addition, a critical path is also shorter by one multiplier, thus enabling process at a high operating frequency.

As has been described above, according to the first embodiment, all the multipliers of each unit operate every clock without making a standby state during all the clocks of the pipeline period, and it is found that the throughput per circuit scale (the number of multipliers in main calculation unit) is optimized. The critical path in the entire apparatus is determined depending on this calculation due to pipeline process, and there are provided an algorithm and hardware configuration in which a redundant delay due to t-calculation does not occur.

According to the modular multiplication apparatus, modular multiplication method, and modular exponentiation apparatus of the first embodiment, throughput per circuit scale is optimized in Montgomery multiplication due to pipeline process of a plurality of units and a redundant delay due to calculation of t does not take place.

Further, in Montgomery multiplication due to pipeline process of a plurality of units, even when the number of processing units is reduced to be equal to or smaller than a word count, only the lowering of speed proportional to the reduced number of processing units occurs. Efficiency of an apparatus defined by a process speed per circuit scale is constant irrespective of the number of units. The modular multiplication apparatus and method and the modular exponentiation apparatus being suitable to be used in a process for RSA cryptosystem or the like.

According to the present embodiment, there is provided a modular multiplication apparatus, a modular multiplication method, and a modular exponentiation apparatus in which throughput per circuit scale is optimized in Montgomery multiplication due to pipeline process of a plurality of units and a redundant delay due to calculation of t does not take place.

Further, there is provided a modular multiplication apparatus, a modular multiplication method, and a modular exponentiation apparatus in which, in Montgomery multiplication due to pipeline process of a plurality of units, even when the number of processing units is reduced to be equal to or smaller than a word count, only the lowering of speed proportional to the reduced number of processing units occurs; efficiency of an apparatus defined by a process speed per circuit scale is constant irrespective of the number of units; the modular multiplication apparatus and method and the modular exponentiation apparatus being suitable to be used in a process for RSA cryptosystem or the like.

Now, other embodiments of a modular exponentiation apparatus according to the present invention will be described below. In a description of the other embodiments, same elements in the first embodiment are designated by same reference numerals. A detailed description is omitted here.

SECOND EMBODIMENT

A block diagram according to a second embodiment of the present invention is identical to that according to the first embodiment, and is not shown here.

In the second embodiment, a description will be given with respect to a process in the case where Montgomery multiplication using small modulo N is carried out by using the configuration of the first embodiment. That is, the number of units u is $u > n+1$ ($u \geq 2$).

In this case, the lower n+2 units are used in Montgomery multiplication, and process of the carry process unit in Montgomery multiplication algorithm applied in the first embodiment is carried out by unit n+1, thereby making it possible to execute Montgomery multiplication described in the first embodiment. At this time, the pipeline period is $2(n+1)+\epsilon$ which is identical to that of the first embodiment.

THIRD EMBODIMENT

In a third embodiment of the present invention, a description will be given with respect to a process in the case where Montgomery multiplication in which a large modulo N, i.e., the number of units u is $u < n+1$ ($u \geq 2$) is carried out by using a configuration identical to that of FIG. 5 in the first embodiment. Internal configurations of each unit i(31), t-calculation unit 40, and carry process unit 50 according to the third embodiment are different from those of the first embodiment. However, there is no difference in FIG. 5, and thus, same elements are designated by same reference numerals, and a description will be given below.

Montgomery multiplication algorithm applied in the third embodiment is as follows.

Process of Unit i (31)
   $C(x(i-1)y(j))=0$, $C(N(i-1)t(j))=0$
   (for $i=0$ & $j=0, \ldots, n$)
   $M(N(i+uk+1)t(j-1))=0$
   (for $j=0$ & $k=0, \ldots, p-1$)
     for $j=0, \ldots, n$
       for $k=0, \ldots, p-1$
   $I=i+uk$
   step 1: $C(x(I)y(j))||M(x(I)y(j))=x(I)y(j)+C(x(I-1)y(j))+M(N(I+1)t(j-1))$ ... clock $I+Dj$ Step 2: $C(N(I)t(j))||M(N(I)t(j))=N(I)t(j)+C(N(I-1)t(j))+M(x(I)y(j))$ ... clock $I+Dj+1$
Step 3: if ($k<p-1$), standby state (($u-2$) clocks)
   next k
  next j Process of t-calculation unit 40
  $t(-1)=0$, $C(N(0)t(-1))=0$, $M(x(1)y(-1))=0$
  for $j=0, \ldots, n$
  Step 1: $v(j)=L(x(0)y(j))$ ... clock $Dj-1$
  Step 2: $t(j)=L(N_{inv}L(v(j)+M(N(1)t(j-1))))$ ... clock $Dj$
  Step 3: Standby state ($u(p-1)$ clocks)
  next j Process of carry process unit 50
  for $j=0, \ldots, n$
  Step 0: Standby state ($u(p-1)$ clocks)
  Step 1: $M(x(n+1)y(j))=C(x(n)y(j)$ ... Clock $n+Dj+1$
  Step 2: $M(N(n+1)t(j))=C(N(n)t(j))+M(x(n+1)y(j))$ ... clock $n+Dj+2$
  next j In the above algorithm, p is the minimal integer equal to or greater than $(n+1)/u$, $D=u(p-1)+2$.

Figure 11:
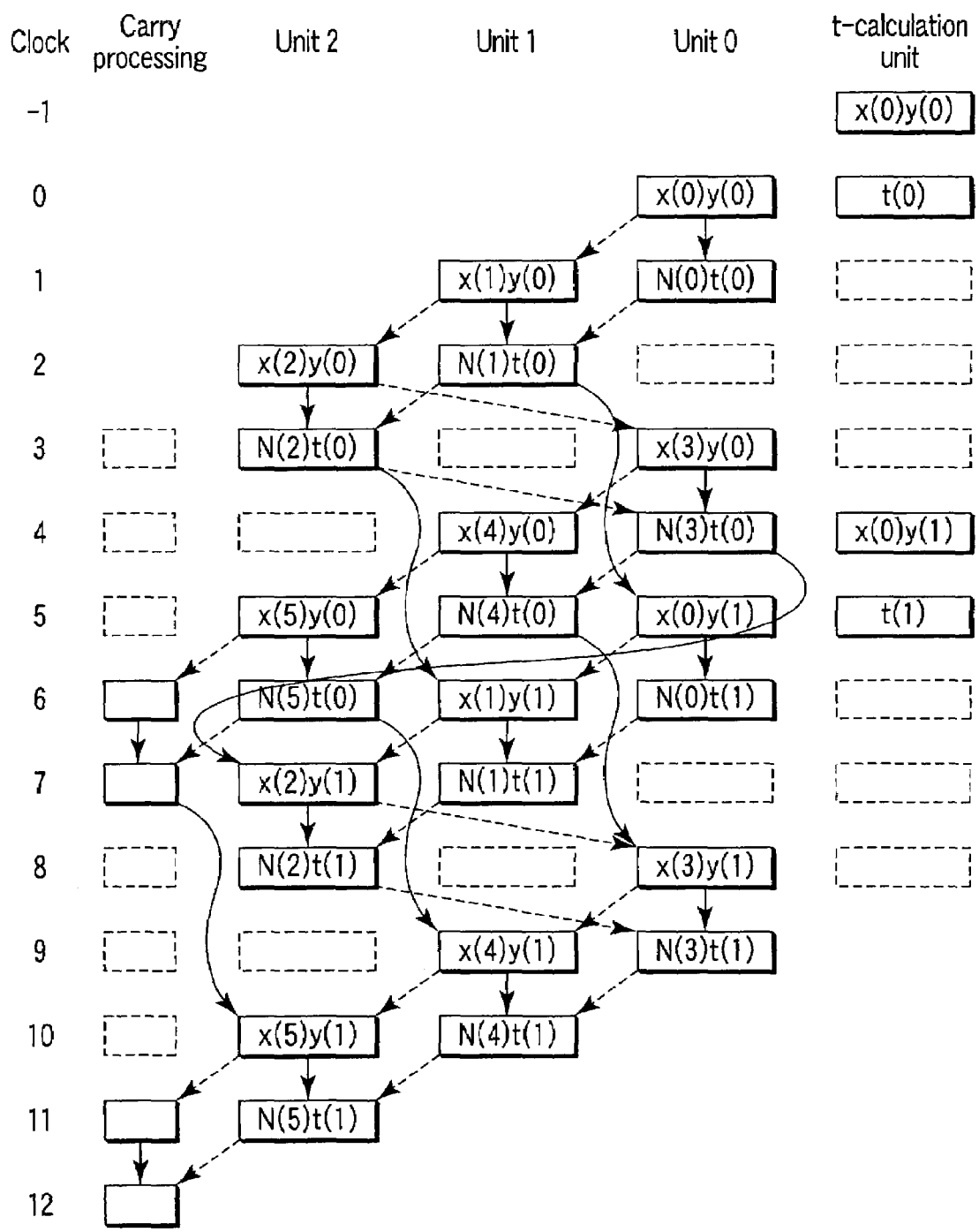
FIG. 11 is a diagram showing a flow of pipeline process according to a third embodiment of the present invention.

A flow of pipeline process in accordance with Montgomery multiplication algorithm applied in the third embodiment is shown in FIG. 11 with respect to a process up to $j=1$ when $n=5$ and $u=3$. In the case of $u<n+1$ according to the third embodiment, in process of the unit i, repetition process concerning k is required, and a standby state is inserted concurrently. $M(N(I)t(j))$ in step 2 cannot be passed to the unit i−1 in the same clock, and thus, they are temporarily stored in a register or RAM, and readout is carried out as required. In process of the t-calculation unit 40 and process of the carry process unit 50 as well, a standby state occurs in synchronism with process of the unit i. The pipeline period in accordance with Montgomery multiplication algorithm applied to the third embodiment is $D(n+1)$.

FIG. 12A and FIG. 12B shows a hardware configuration of the unit i(31) according to the third embodiment. A modification from FIG. 8 according to the first embodiment is that the register R1 is replaced with p registers R1(k) ($k=0, \ldots, p-1$). In clock $I+Dj$, as shown in FIG. 12A, $M(N(I+1)t(j-1))$ is read from the register R1(k) of the unit i+1, and calculation is carried out. Concurrently, at clock $I+Dj+1$, as shown in FIG. 12B, $M(N(I)t(j))$ is stored in the register R1(k).

p registers R1(k) may comprise a RAM. Further, there may be employed a system for providing the register or RAM at the main calculation unit 30 in batch instead of providing them for each unit. In order to execute repetition process concerning k, the least significant bit unit 0 inputs $M(N(I)t(j))$ ($I=i+uk$, $i=0$, $k=1, \ldots, p-1$) to the least significant bit unit u−1, and the least significant bit unit u−1 inputs an output $y(j)$, $t(j)$, $C(x(I)y(j))$, $C(N(I)t(j))$ ($I=i+uk$, $i=u-1$, $k=0, \ldots, p-2$) to the least significant bit unit 0.

Figure 13:
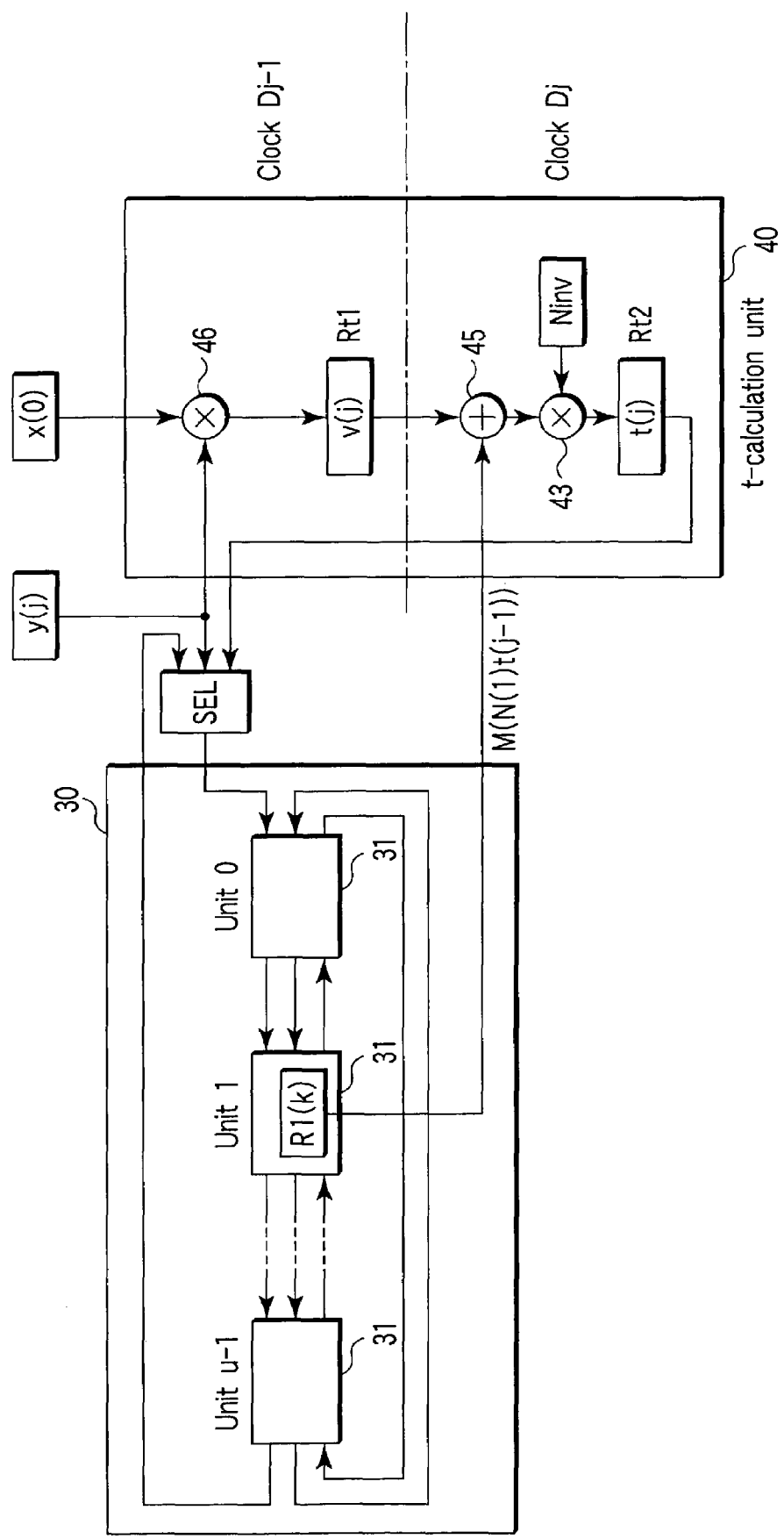
FIG. 13 is a diagram showing a configuration of a t-calculation unit 40 according to the third embodiment.

FIG. 13 shows a hardware configuration of the t-calculation unit 40. A modification from FIG. 9 according to the first embodiment is that, as an input from the main calculation unit 30, calculation of v(j) is performed by one multiplier 46, and that $M(N(i)t(j-1))$ is input from the register R1(0) of the unit 1 to the adder 45 of the t-calculation unit 40. In addition, in order to execute repetition process concerning k, wiring for passing a variable from the least significant bit unit to the most significant bit unit and vice versa is additionally provided. Calculation of M(N(1)

t(j−1)) ends before two or more clocks than clock Dj that is a calculation timing of t(j), and thus, there may be employed a system for incorporating M(N(1)t(j−1)) in advance into a register or RAM of the t-calculation unit 40 before clock Dj.

A description will be given with respect to process of the carry process unit 50. A difference from the carry process unit 50 according to the first embodiment is that an addition result M(N(n+1)t(j)) is written into the register R of FIG. 10 in step 2 of clock n+Dj+2. The thus written data is supplied to the least significant bit unit u−1 at clock n+D(j+1). A supplemental description will be given with respect to a relationship between u and n. In the case where u is a measure of n+1, a circuit for process of the carry process unit 50 is required. As in the first embodiment, there may be employed a system for providing such a circuit irrespective of u units or there may be employed a system for incorporating such a circuit into the most significant bit unit u−1. In the case where u is not a measure of n+1, a unit which can be used for process of the carry process unit 50 exists. Thus, as in the second embodiment, process of the carry process unit 50 is carried out by a unit n+1−u(p−1), thereby making it possible to execute Montgomery multiplication algorithm applied in the third embodiment.

With such a configuration as described above, Montgomery multiplication described in the first embodiment can be executed in a configuration of the number of units u (<n+1) as well.

FOURTH EMBODIMENT

In a fourth embodiment of the present invention, a modified example of Montgomery multiplication according to the first embodiment will be described here. Although the number of units is u=n+1 as in the first embodiment, a difference is u≧3. The internal configurations of each unit i, the t-calculation unit 40, and the carry process unit 50 according to the fourth embodiment are slightly different from those according to the first embodiment. In particular, there is no difference in FIG. 5, and thus, same elements are designated by same reference numerals (numbers), and a description will be given below.

Montgomery multiplication algorithm applied in the third embodiment is as follows.

Figure 14:
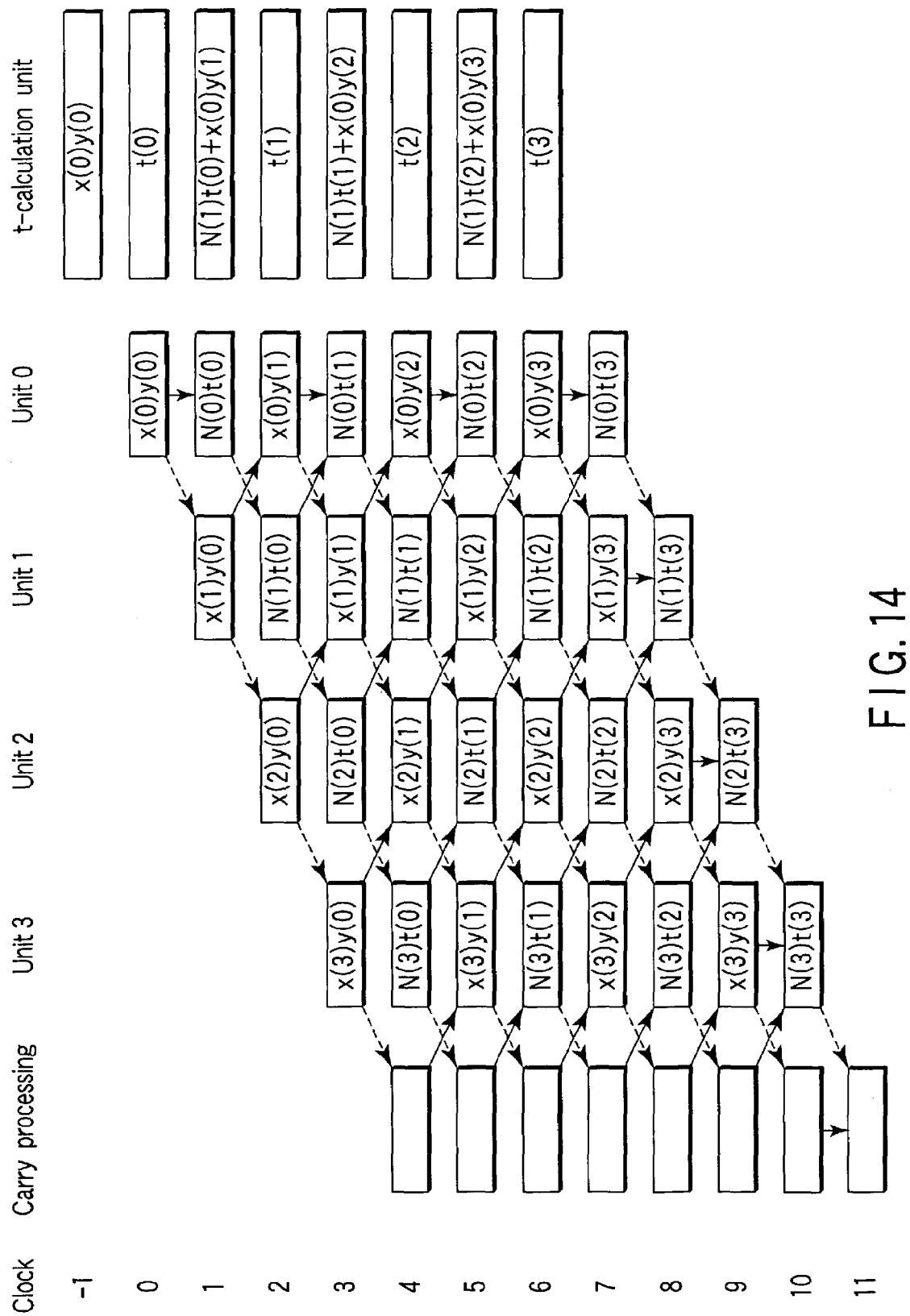
FIG. 14 is a diagram showing a flow of pipeline process according to a fourth embodiment of the present invention.

Process of Unit i (31)
C(x(i−1)y(j))=0, C(N(i−1)t(j))=0
(for i=0 & j=0, . . . , n)
M(x(i+1)y(−1))=0, M(N(i+1)t(−1))=0
for j=0, . . . , n
Step 1: C(x(i)y(j))∥M(x(i)y(j))=x(i)y(j)+C(x(i−1)y(j))+M(x(i+1)y(j−1)) . . . clock i+2j
Step 2: If (i=0 or j=n)
then C(N(i)t(j))∥M(N(i)t(j))=N(i)t(j)+C(N(i−1)t(j))+M(N(i+1)t(j−1))+M(x(i)y(j))
else C(N(i)t(j))∥M(N(i)t(j))=N(i)t(j)+C(N(i−1)t(j))+M(N(i+1)t(j−1) . . . clock i+2j+1
next j Process of t-calculation unit 40
t(−1)=0, C(N(0)t(−1))=0, M(x(1)y(−1))=0
for j=0, . . . , n
Step 1: v(j)=L(N(1)t(j−1)+x(0)y(j)) . . . clock 2j−1
Step 2: t(j)=L(N$_{inv}$L(v(j)+C(N(0)t(j−1))+M(x(1)y(j−1))+M(N(2)t(j−2))) . . . clock 2j
next j Process of carry process unit 50
for j=0, . . . , n
Step 1: M(x(n+1)y(j))=C(x(n)y(j)) . . . clock n+2j+1
Step 2: if (j=n)
then M(N(n+1)t(j))=C(N(n)t(j))+M(x(n+1)y(j))
else M(N(n+1)t(j))=C(N(n)t(j)) . . . clock n+2j+2
next j FIG. 14 shows a flow of pipeline process in accordance with Montgomery multiplication algorithm applied in the fourth embodiment in the case of n=3, u (=n+1)=4. A difference from Montgomery multiplication applied in the first embodiment is how to process a sum of M(x(i)y(j)) and M(N(i)t(j)), as described below.

FIG. 15 shows a hardware configuration of the unit i(31) according to the fourth embodiment. A modification from FIG. 8 according to the first embodiment is that the register R1 of the unit i is connected to the adder of the unit i−1 in order to input M(x(i)y(j)) and M(N(i)t(j)) to the low-order unit in a next clock.

In addition, step 2 of process of the unit i is conditionally branched according to i, j as follows. In j=0, . . . , n of the unit 0 and j=n of all units, a lower port of a selector in FIG. 16 is selected, and a value (M(x(1)y(j−1))) of the register R1 as well is added at the t-calculation unit 40. In the other process, a port on a selector is selected, and addition from the register R1 is not carried out at the t-calculation unit 40.

Similarly, in process of the carry process unit 50 as well, step 2 is conditionally branched according to whether or not j=n, as described above.

Now, a hardware configuration of the t-calculation unit 40 is shown in FIG. 16. A modification from FIG. 9 according to the first embodiment is that inputs from the main calculation unit 30 to the adder 45 are obtained as three signals from the unit 0, the unit 1, and the unit 2.

With respect to the carry process unit 50, process of the above carry process unit 50 can be executed by a hardware configuration similar to that shown in FIG. 10 according to the first embodiment.

In a critical path according to the fourth embodiment, one adder is reduced (one multiplier+one adder) as compared with the first embodiment, as connection of the register R1 of the unit i has been changed. However, one adder of the unit i and one input path to the lower adder are increased, and thus, a difference in the critical path is considered as depending on the internal configuration of the adder. In addition, with respect to the hardware scale, as in the first embodiment, the main calculation unit has (2×u) multipliers, and the t-calculation unit 40 has two multipliers.

FIFTH EMBODIMENT

In a fifth embodiment of the present invention, a description will be given with respect to a process in the case where Montgomery multiplication using a small modulo N is carried out by using the configuration according to the fourth embodiment. That is, the number of units u is u>n+1 (u≧3).

In this case, the lower n+2 units are used in Montgomery multiplication, and process of the carry process unit 50 for Montgomery multiplication algorithm applied in the fourth embodiment is carried out by unit n+1, thereby making it possible to execute Montgomery multiplication described in the fourth embodiment. At this time, the pipeline period is 2(n+1)+ϵ which is identical to that according to the fourth embodiment.

SIXTH EMBODIMENT

In a sixth embodiment of the present invention, a description will be given with respect to a process in the case where Montgomery multiplication using a large modulo N is carried out by using the configuration according to the fourth embodiment. That is, the number of units is u<n+1 (u≧3).

Montgomery multiplication algorithm applied in the sixth embodiment is as follows.

Process of the unit i
  $C(x(i-1)y(j))=0$, $C(N(i-1)t(j))=0$
    (for i=0 & j=0, . . . , n)
  $M(x(i+uk+1)y(j-1))=0$, $M(N(i+uk+1)t(j-1))=0$
    (for j=0 & k=0, . . . , p-1)
      for j=0, . . . , n
        for k=0, . . . , p-1
  I=i+uk
  Step 1: $C(x(I)y(j))\|M(x(I)y(j))=x(I)y(j)+C(x(I-1)y(j))+M(x(I+1)y(j-1))$ . . . clock I+Dj
  Step 2: if (I=0 or j=n)
    then $C(N(I)t(j))\|M(N(I)t(j))=N(I)t(j)+C(N(I-1)t(j))+M(N(I+1)t(j-1))+M(x(I)y(j))$
    else $C(N(I)t(j))\|M(N(I)t(j))=N(I)t(j)+C(N(I-1)t(j))+M(N(I+1)t(j-1))$ . . . clock I+Dj+1
  step 3: if (k<p-1), standby state ((u-2) clocks)
    next k
  next j Process of t-calculation unit 40
  $t(-1)=0$, $C(N(0)t(-1))=0$, $M(x(1)y(-1))=0$
    for j=0, . . . , n
  Step 1: $v(j)=L(N(1)t(j-1)+x(0)y(j))$ . . . clock Dj-1
  Step 2: $t(j)=L(N_{inv}L(v(j)+C(N(0)t(j-1))+M(x(1)y(j-1))+M(N(2)t(j-2))))$ . . . clock Dj
  Step 3: Standby state (u(p-1) clocks)
  next j Process of carry process unit 50
  for j=0, . . . , n
  Step 0: Standby state (u(p-1) clocks)
  Step 1: $M(x(n+1)y(j))=C(x(n)y(j))$ . . . clock n+Dj+1
  Step 2: if (j=n)
    then $M(N(n+1)t(j))=C(N(n)t(j))+M(x(n+1)y(j))$
    else $M(N(n+1)t(j))$ $C(N(n)t(j))$ . . . clock n+Dj+2
  next j As in the third embodiment, p is the minimum integer which is equal to or greater than (n+1)/u, and is D=u(p-1)+2.

Figure 17:
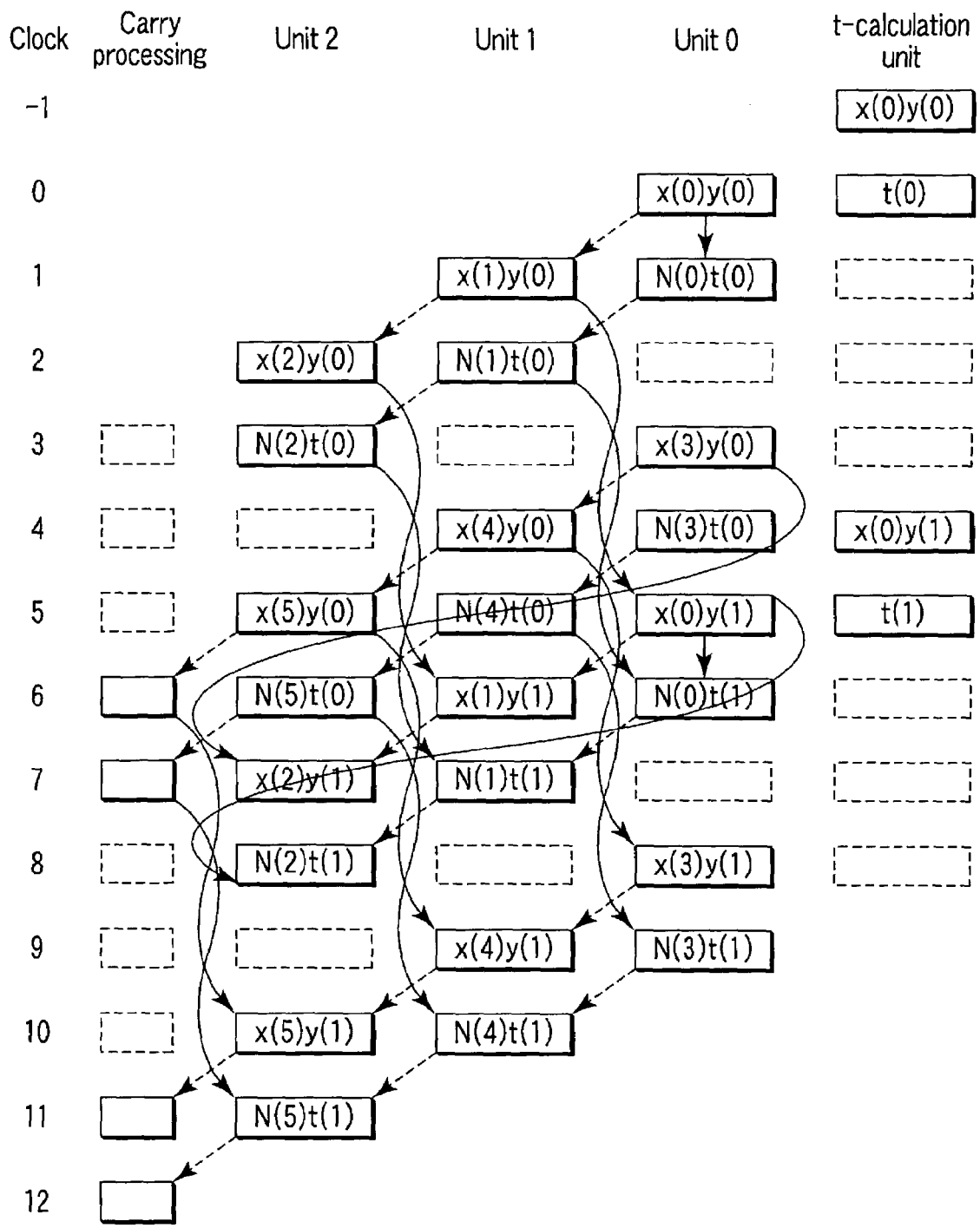
FIG. 17 is a diagram showing a flow of pipeline process according to a sixth embodiment of the present invention.

FIG. 17 shows a flow of pipeline process in accordance with Montgomery multiplication algorithm applied in the sixth embodiment with respect to a process up to j=1 in the case of n=5 and u=3. In the sixth embodiment, as in the third embodiment, repetition process concerning k is required in process of the unit i, and a standby state is inserted concurrently. In process of the t-calculation unit 40 and process of the carry process unit 50 as well, a standby state occurs in synchronism with process of the unit i. As in the third embodiment, the pipeline period of Montgomery multiplication applied in the sixth embodiment is D(n+1).

In a hardware configuration of the unit i(31) according to the sixth embodiment, 2p registers R1 in FIG. 15 according to the fourth embodiment are provided. M(x(I)y(j)) is written into a register R1(1, k) at clock I+Dj, and M(N(I)t(j)) is written into a register R1(2, k) at clock i+Dj+1. The written values are input to the unit i-1 at clock I+D(j+1)-1 and clock I+D(j+1), respectively, and are used in process of the unit i. The registers R1(1, k) and R1(2, k) (k=0, . . . , p-1) each may comprise a RAM. Further, there may be employed a system for providing the register or RAM at the main calculation unit 30 in batch instead of providing them for each unit. In order to execute repetition process concerning k, the least significant bit unit 0 inputs output M(x(I)y(j)), M(N(I)t(j)) (I=i+uk, i=0, k=1, . . . , p-1) to the most significant bit unit u-1, and the most significant bit unit inputs output y(j), t(j), C(x(I)y(j)), C(N(I)t(j)) (I=i+uk, i=u-1, k=0, . . . , p-2) to the least significant bit unit 0.

A hardware configuration of the t-calculation unit 40 according to the sixth embodiment is substantially identical to that shown in FIG. 13 according to the third embodiment. A difference from the third embodiment is that, as an input from the main calculation unit 30, M(x(1)y(j-1)) is input from a register R1(1, 0) of the unit 1, and similarly, M(N(1)t(j-1)) is input from a register R1(2, 0) of the unit 1 to an adder of the t-calculation unit 40. As in the third embodiment, there may be employed a system for incorporating M(x(i)y(j-1)) and M(N(1)t(j-1)) in advance into a register of the t-calculation unit 40 or into a RAM before clock Dj.

With respect to process of the carry process unit 50, two registers R (registers R(1) and R(2)) in FIG. 10 according to the first embodiment are provided; step 1 is executed at clock n+Dj+1, and M(x(n+1)y(j)) is written into the register R(1); and step 2 is executed at clock n+Dj+2, and M(N(n+1)t(j)) is written into the register R(2). For these items of written data, a value of the register R(1) is supplied to the most significant bit unit u-1 at clock n+D(j+1), and a value of the register R(2) is supplied to the unit u-1 at clock n+D(j+1)+1, similarly. With respect to handling in the case where u is a measure of n+1 or not, it is possible to employ a system similar to that according to the third embodiment.

With such a configuration as described above, Montgomery multiplication described in the fourth embodiment can be executed in a configuration in which the number of units is u<n+1.

According to the first to sixth embodiments which have been described above in detail, there can be provided Montgomery multiplication algorithm and a hardware configuration in which throughput per circuit scale is optimized according to each condition, and a redundant delay does not take place due to calculation of t.

According to the first to sixth embodiments, as throughput per circuit scale, there can be achieved a process for modular exponentiation more efficiently by about two to three times, as compared with the conventional technique. In addition, a critical path is shorter by one multiplier, and thus, a process at a high operating frequency than that in the conventional technique can be carried out.

According to the above described embodiments, the t-calculation unit 40 is made independent of the main calculation unit 30, t(j) depending on a result of a calculation in progress is obtained in advance. Thus, the efficiency of pipeline process is improved. Hereinafter, a description will be given with respect to an embodiment in which several contiguous words of a target operator are assigned from a low-order unit according to the modulo size of modular multiplication and the number of processing units so that the load on each processing unit is equalized, thereby improving the efficiency of pipeline process.

SEVENTH EMBODIMENT

An entire configuration according to a seventh embodiment of the present invention is identical to that according to the first embodiment shown in FIG. 1.

Figure 18:
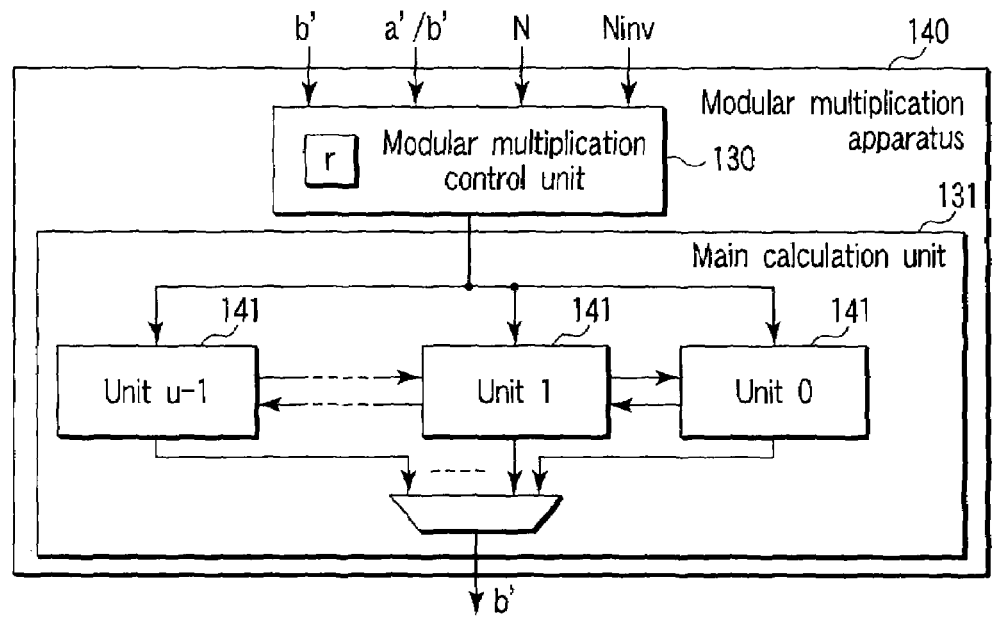
FIG. 18 is a diagram showing a configuration of a modular multiplication apparatus according to a seventh embodiment of the present invention.

FIG. 18 shows a detail on a modular multiplication apparatus 140 according to the seventh embodiment. The modular multiplication apparatus 140 outputs w=MM(x, y, N) based on inputs x, y, N, and $N_{inv}$. This calculating apparatus 140 carries out processing units (hereinafter, simply referred to as "units", and expressed as unit 0, unit 1, . . . , unit u−1) in order to achieve high speed process. In the seventh embodiment, it is assumed that a case in which the number of units u is u=n+2 is handled, and one unit is responsible for calculation of one word. As described later, in the case where one unit is responsible for calculation of one word, u=n+2 will be sufficient in number of units u relevant to the word count n of modulo N.

The modular multiplication apparatus 140 comprises a Modular multiplication control unit 130 and a main calculation unit 131, as shown in FIG. 18. The Main calculation unit 131 is configured so that u units 141 are connected in series. The modular multiplication control unit 130 serves to control the main calculation unit 131 according to an input. The contents of control will be described later.

Figure 19:
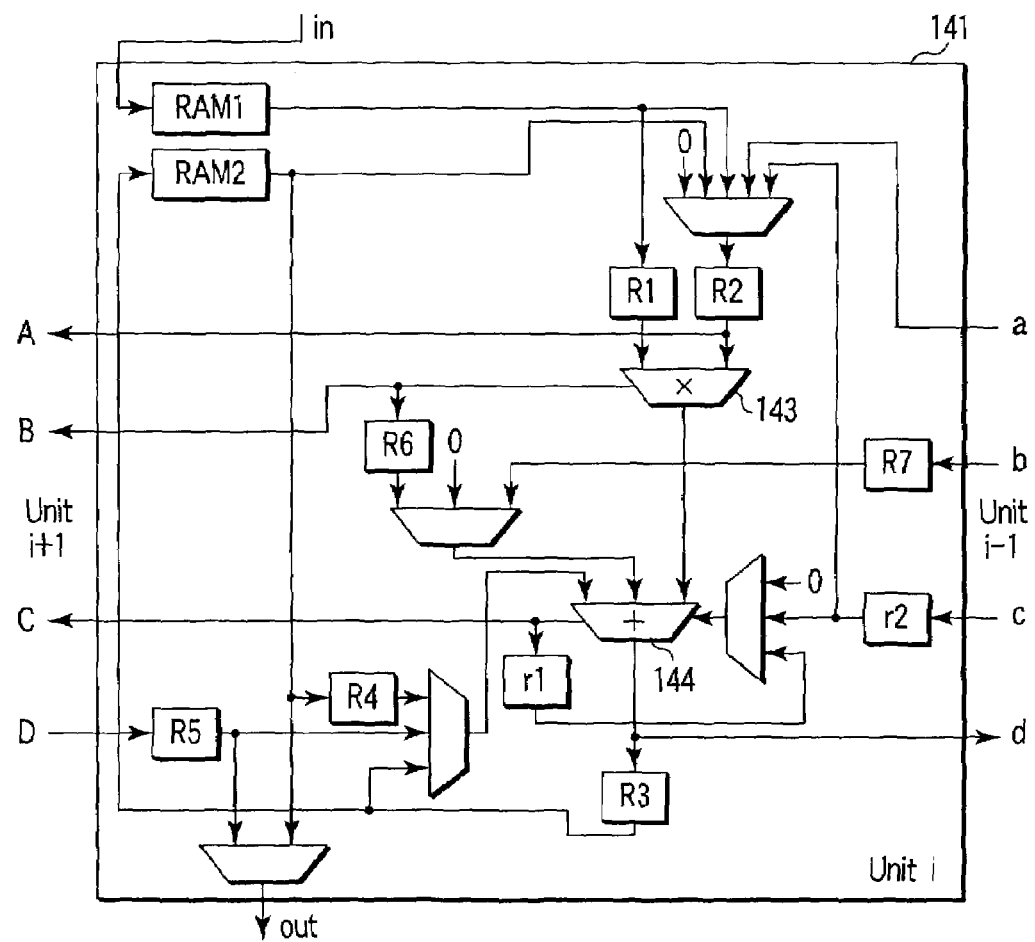
FIG. 19 is a diagram showing a configuration of a calculation unit 141 according to the seventh embodiment.
Figure 20:
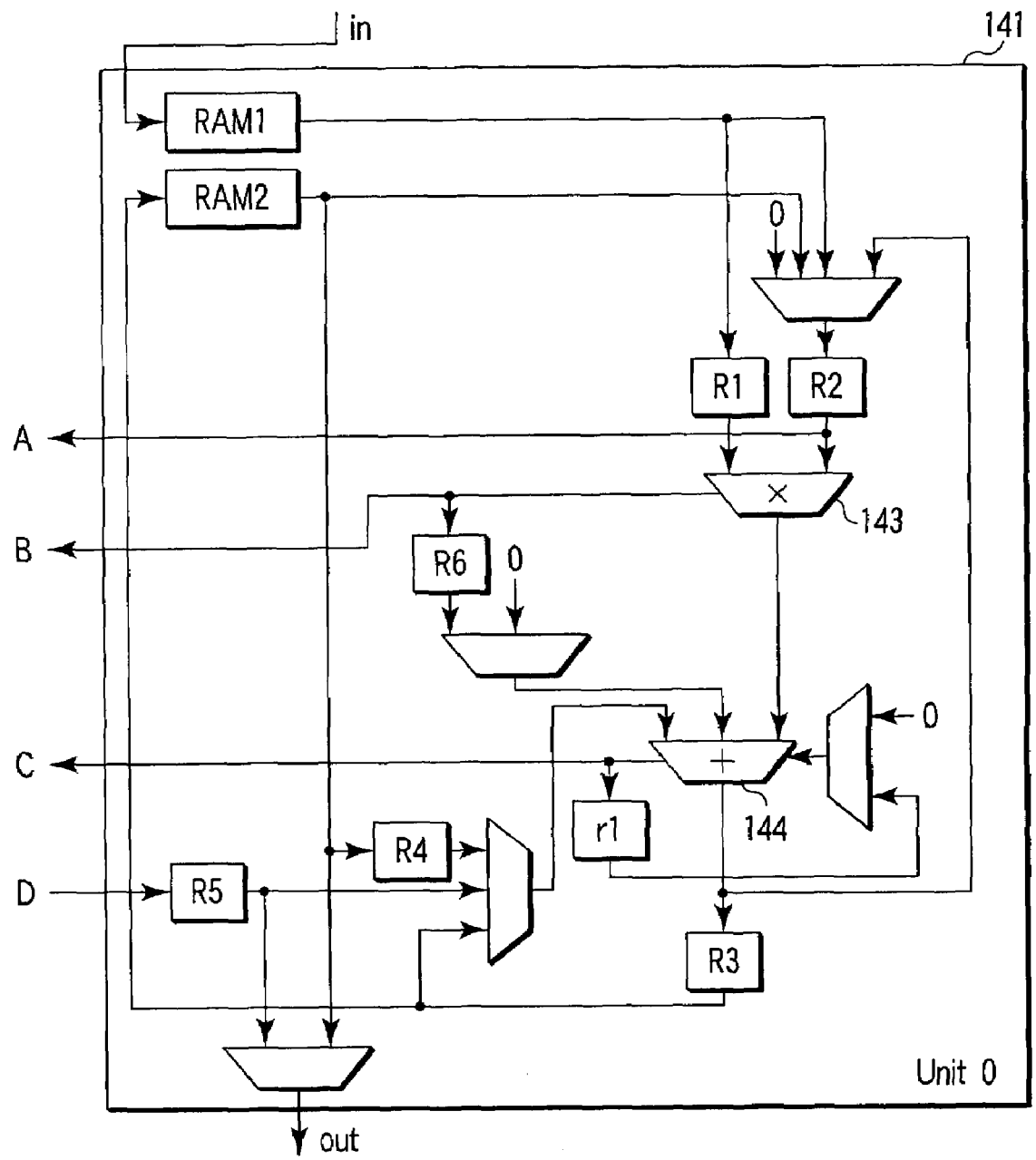
FIG. 20 is a diagram showing a configuration of the calculation unit 141 at the least significant bit according to the seventh embodiment.

Each unit 141 is provided as a multiplier-adder unit as shown in FIG. 19, and a, b, c, and d of the unit i are connected to A, B, C, and D of the unit i−1, respectively. However, the unit 0 is configured as shown in FIG. 20 because no lower-order unit exists. In addition, the unit u−1 which is the most significant bit unit is configured as shown in FIG. 21 because no upper-order unit exists. The units of FIG. 20 and FIG. 21 are configured to be included in a unit of FIG. 19, and can be configured by using the unit of FIG. 19.

Each unit 141 comprises one 2-input multiplier 143; one 4-input adder 144; registers R1, R2, R3, R4, R5, R6, and R7 capable of storing a calculation value of r bits; registers r1 and r2 capable of storing a calculation value of two bits; RAM1 and RAM2 capable of storing a plurality of calculation values; or its substitute. The configuration of each of the units shown in FIG. 19, FIG. 20, and FIG. 21 are redundant in order to achieve the seventh embodiment. However, an eighth embodiment and a ninth embodiment can be achieved by the same configuration, and thus, this configuration is employed.

Figure 22:
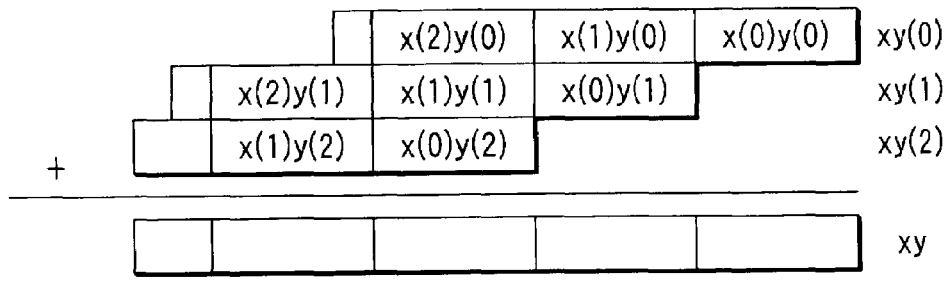
FIG. 22 is a diagram showing a procedure for multiplying variable x and variable y in Montgomery multiplication according to the seventh embodiment.
Figure 23:
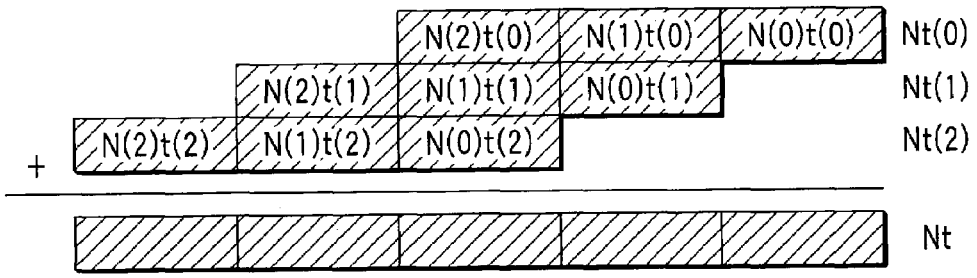
FIG. 23 is a diagram showing a procedure for multiplying variable N and variable t in Montgomery multiplication according to the seventh embodiment.
Figure 24:
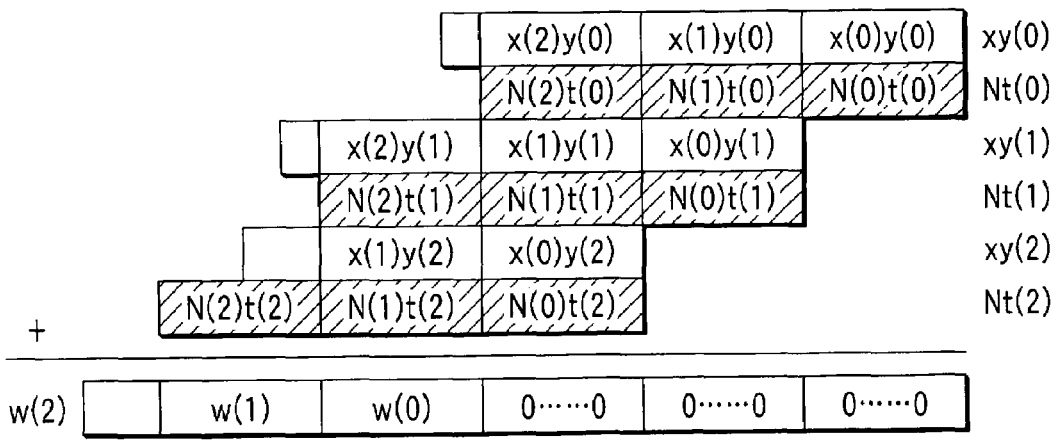
FIG. 24 is a diagram showing a procedure for calculating xy+Nt in Montgomery multiplication according to the seventh embodiment.

Now, an operation of the modular multiplication apparatus 140 will be described here. First, for clarity, calculations of Montgomery multiplication w=(xy+Nt)/R will be shown in order with respect to size n=2 of modulo N. FIG. 22 shows a procedure for calculating xy. The figure shows that a sum of xy(0), xy(1), and xy(2), namely, addition in a longitudinal direction, is produced as xy. At this time, it should be noted that digit round-up from x(i−1)y(j) is added to x(i)y(j). Similarly, FIG. 23 shows a procedure for calculating Nt in which a sum of Nt(0), Nt(1), and Nt(2) is produced as Nt. Here, xy(0), xy(1) is produced as 3r+1 bits at most, and xy(2) is produced as 2r+2 bits under a condition for a variable described previously. In addition, Nt(0), Nt(1), and Nt(2) are produced as 3r bits, respectively. Further, xy+Nt is produced as 5r+1 bits as shown in FIG. 24, and its lower 3r bits are always 0 because of nature of Montgomery multiplication, and the upper 2r+1 bits are produced as w. In general, the following result is obtained in the case of the number of words n.

xy(j): (n+1)r+1 bits at most when $0 \leq j < n$
nr+2 bits at most when j=n
Nt(j): (n+1)r bits at most
xy+Nt: (2n+1)r bits at most, provided if the lower (n+1)r bits are 0, and the upper nr+1 bits are w.

From these facts, assuming that the maximum lengths of a target operator and a calculation result are (n+1)r+1 bits, and one word is in r bits, it is sufficient if a unit capable of handling calculation of n+2 words is provided. In the first to sixth embodiments, an (n+2)-th word does not handle only calculation of one bit at most, and thus, this is handled at the carry process unit 50. Thus, u=n+1 has been defined as a minimum number of units achieving its best performance relevant to n. In the seventh to tenth embodiments, it is assumed that one unit carries out a process which has been carried out by the carry process unit 50 in the first to sixth embodiments, and u=n+2 is defined as a minimum number of units achieving its best performance relevant to n. As in the first to sixth embodiments, an (n+2)-th word may be handled at the carry process unit 50.

Figure 25:
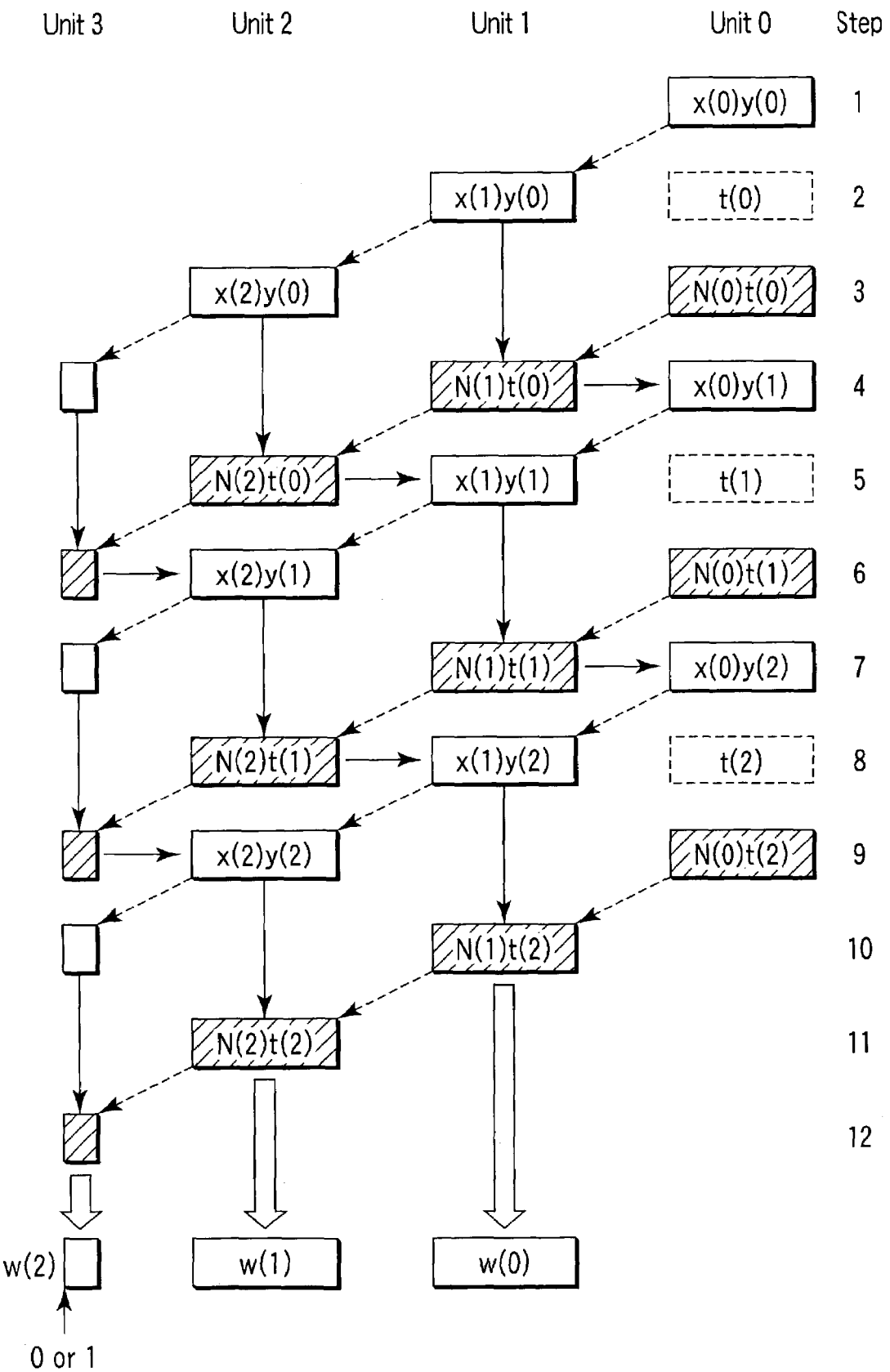
FIG. 25 is a diagram showing a procedure for calculating xy+Nt according to the seventh embodiment.

An object of the modular multiplication apparatus 140 is to efficiently carry out calculation shown in FIG. 24. FIG. 25 shows that one unit carries out one word in FIG. 24, and a process is assigned to each unit. In FIG. 25, a column designates a unit, and a line designates a calculation step. Round-up from x(i−1)y(j) to x(i)y(j) in FIG. 24 and round-up from N(i−1)t(j) to N(i)t(j) are indicated by the arrow expressed by dotted line, and integration in a longitudinal direction in FIG. 24 is indicated by the arrow expressed by solid line. Here, the step does not always correspond to a clock. Unit i sequentially calculates x(i)y(j) and N(i)t(j) with respect to j=0, 1, . . . , n. x(i)y(j) is processed in the step later than x(i−1)y(j) because it is required to add to x(i)y(j) a round-up value obtained by calculation of x(i−1)y(j). This applies to N(i)t(j) similarly. In addition, the unit 0 calculates t(j) in addition to x(i)y(j) and N(i)t(j). t(j) is calculated by t(j)=w(0)$N_{inv}$ mode $2^r$, as designated by Montgomery multiplication algorithm. When these facts are summarized, process of the unit i can be described as follows.

Process algorithm of the unit i in the seventh embodiment
C(x(i−1)y(j))=0, C(N(i−1)t(j))=0
(for i=0 & j=0, . . . , n)
M(N(i+1)t(−1))=0
for j=0, 1, . . . , n $$C(x(i)y(j)) \| M(x(i)y(j)) = x(i)y(j) + C(x(i-1)y(j)) + M(N(i+1)t(j-1)) \quad (31)$$

If (i=0)

$$t(j) = M(x(0)y(j))N_{inv} \quad (32)$$

$$C(N(i)t(j)) \| M(N(i)t(j)) = N(i)t(j) + C(N(i-1)t(j)) + M(x(i)y(j)) \quad (33)$$

next j

Here, the process step of the unit i will be described in detail. First, x(i)y(j) is calculated in the unit i. At this time, the digit round-up C(x(i−1)y(j)) from the lower words and the existing accumulated value M(N(i+1)t(j−1)) are added. The lower r bits of this result is M(x(i)y(j)), and the upper portion is C(x(i)y(j)).

In the next step, N(i)t(j) is calculated. At this time, the round-up C(N(i−1)t(j)) from the low-order word and the existing accumulated value M(x(i)y(j)) are added. The lower r bits of this result is M(N(i)t(j)), and the upper portion is C(N(i)t(j)). Then, calculation of x(i)y(j+1), N(i)t(j+1), x(i)y(j+2) to j=n are sequentially carried out.

Further, in the unit 0, during the above calculation of x(i)y(j) and N(i)t(j), t(j) is calculated by using the existing accumulated value M(x(i)y(j)). This value of t(j) may be calculated by only the unit 0. In the subsequent step, the values are sequentially transmitted from the unit 0 to the unit 1, from the unit 1 to unit 2 and so on.

The brief description of process has now been completed. The following process is carried out at the modular multiplication apparatus 140 of FIG. 18. First, x and N input to the modular multiplication control unit 130 are divided on a word by word basis, respectively, and x(i) and N(i) are stored in RAM1 of the unit i, and the stored data is read out by the registers R1 and R2 of each unit at a proper timing of calculation. In addition, y is divided on a word by word basis, similarly, and is stored in only RAM1 of the unit 0. With advancement of the steps, y(j) is sequentially delivered from the unit 0 to the unit 1 and from the unit 1 to the unit 2 through wires A and "a" of each unit. $N_{inv}$ is also stored in RAM1 of the unit 0.

As described previously, operation of the unit i can be divided into two steps. One is a step of calculating x(i)y(j) in equation (31), and the other is a step of calculating N(i)t(j) in equation (33).

In the step of calculating x(i)y(j) in equation (31), x(i) is read out from RAM1 at the register R1 as preparation. In addition, as described previously, y(j) is read from the unit i−1 through the wire "a" and stored in the register R2. In addition, the digit round-up value C(x(i−1)y(j)) from the low-order word is stored in the registers R7 and r2 (a value obtained by adding a round-up value in R2 and a round-up value in r2 to each other is C(x(i−1)y(j)), and the accumulated value M(N(i+1)t(j−1)) is stored in the register R5.

Under these conditions, the unit i carries out calculation of x(i)y(j) in equation (31). After process, an accumulated value M(x(i)y(j)) is stored in the register R3; the digit round-up C(x(i)y(j)) is stored to be divided into the registers R7 and r2 of the unit i+1; and the stored data is used in the next step, respectively. Here, C(x(i)y(j)) is obtained by adding the digit round-up produced by the multiplier and the digit round-up produced by the adder. The digit round-up of the multiplier is stored in the register R7, and the digit round-up of the adder is stored in the register r2.

Next, in the step of calculating N(i)t(j) in equation (33), N(i) is read out from RAM1 in the register R1 as preparation. In addition, as described previously, t(j) is read from the unit i−1 through the wire "a" and stored in the register R2. In addition, the digit round-up value from the low-order word is stored in the registers R7 and r2 (a value obtained by adding the digit round-up value in R7 and the digit round-up value in r2 is C(N(i−1)t(j))), and the accumulated value M(x(i)y(j)) is stored in the register R5.

Under these conditions, the unit i carries out calculation of N(i)t(j) in equation (33). After process, the accumulated value M(N(i)t(j)) is stored in the register R5 of the unit i−1; the digit round-up value C(N(i)t(j)) is stored to be divided into the registers R7 and r2 of the unit i+1, and the stored data is used in the next step, respectively. As with C(x(i)y(j)), C(N(i)t(j)) is obtained by adding the digit round-up produced by the multiplier and the digit round-up produced by the adder. The digit round-up of the multiplier is stored in R7, and the digit round-up of the adder is stored in r2.

In addition, unit 0 also carries out calculation of t(j) in equation (32) in addition to calculation of x(i)y(j) and N(i)t(j). In this case, the accumulated value M(x(0)y(j)) is stored in the register R2; $N_{inv}$ is stored from RAM1 in the readout register R1; and t(j) M(x(0)y(j)) $N_{inv}$ mod $2^r$ is calculated by using the above data. The thus calculated t(j) is sequentially delivered to the upper unit through the wires A and "a" of each unit, and the data is used in respective units.

In this manner, calculation of j=0, 1, . . . , n is carried out, and n+1 words of M(N(i)t(j)) stored in the register R5 of unit u−2 from unit 0 at a time when process of j=n has terminated is output as w(0), w(1), . . . , w(n) as a result of Montgomery multiplication.

The seventh embodiment is provided as a basic mode for proposing a modular exponentiation apparatus in which, even when the number of units "u" is reduced as u<n+2, only the lowering of efficiency proportional to the reduced number of units occurs. A processing method in the case where u<n+2 will be presented in the ninth embodiment.

EIGHTH EMBODIMENT

In an eighth embodiment of the present invention, a description will be given with respect to a process in the case where Montgomery multiplication if the number of units is u>n+2 is carried out by using a configuration identical to that shown in FIG. 19 according to the seventh embodiment. In this case, as in the second embodiment and the fifth embodiment, if the lower n+2 units are used in Montgomery multiplication, and a unit exceeding n+2 is not used for calculation, Montgomery multiplication can be executed in accordance with the method described in the seventh embodiment.

NINTH EMBODIMENT

In the ninth embodiment of the present invention, a description will be given with respect to a process in the case where Montgomery multiplication if the number of units u is fewer than a word count of modulo N, namely, if u<n+2, is carried out by using a configuration identical to those of the seventh and eighth embodiments. In this case, the number of units is fewer than the word count, and thus, calculation of a plurality of words must be carried out in one unit. In assignment of calculation to each unit, the Modular multiplication control unit 130 assigns "s" contiguous words such that assignment to each unit is made uniform by the number of input words n and the number of units u of the modular multiplication apparatus 140, and controls operation of the modular multiplication apparatus 140 based on the assignment. It is not required to specifically define assignment of calculation to units by the Modular multiplication control unit 130 as long as a load of each unit is uniform. One example of such assignment includes a method for defining a minimum integer of s=[(n+2)/u] or more, and sequentially assigning s words to units until n+2 words has been reached. For example, if calculation of eight words (n=8) is carried out in four units (n=4) from units 0 to unit 3, the first to third words are assigned to unit 1; the seventh to ninth words are assigned to unit 2; and lastly the tenth words is assigned to unit 3. In an additional assignment method, three words may be assigned to unit 0 and unit 1 each, and two words are assigned to unit 2 and unit 3 each.

Figure 26:
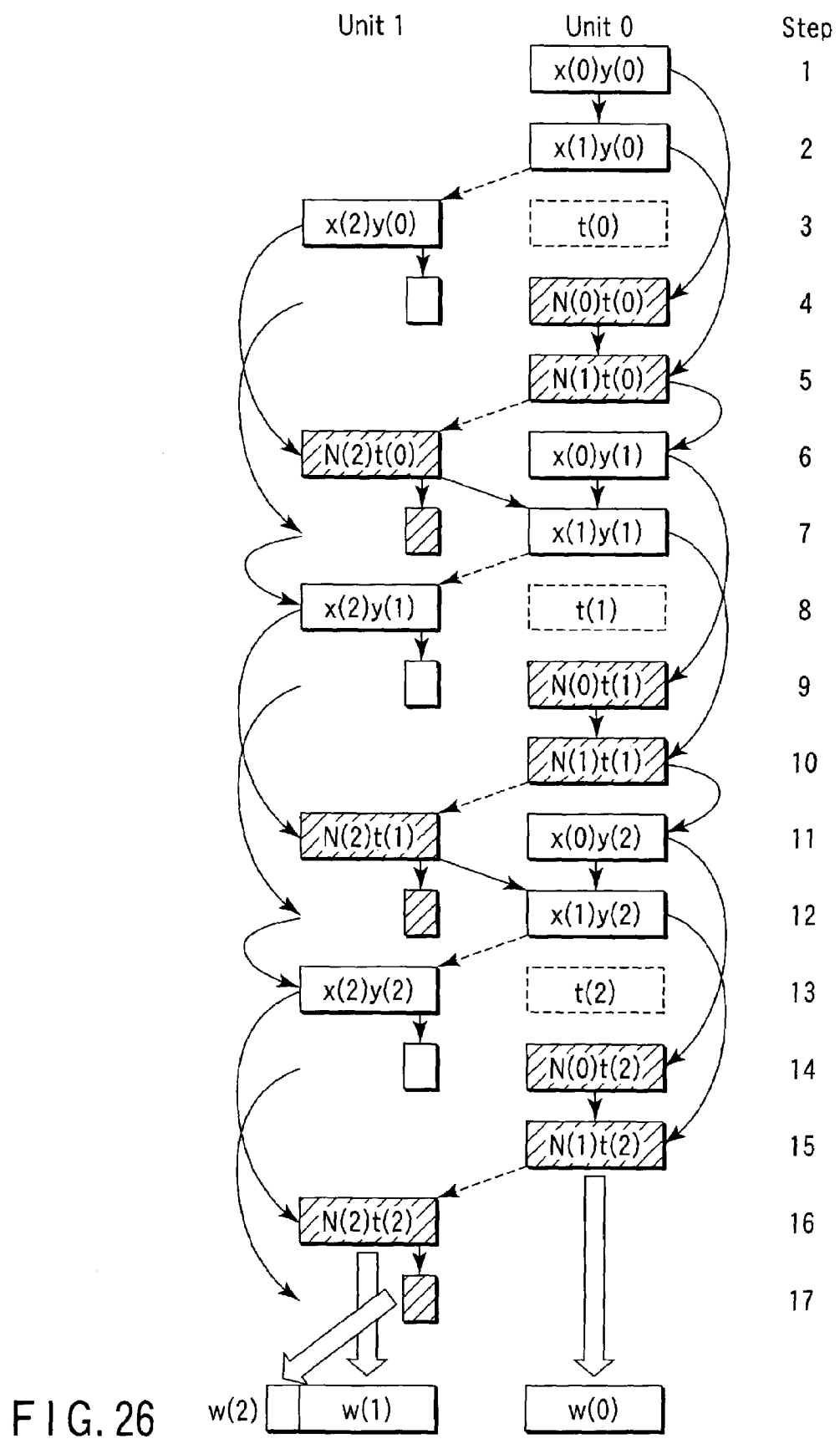
FIG. 26 is a diagram showing a procedure for calculating xy+Nt according to a ninth embodiment of the present invention.

First, a description will be given with respect to a process in the case where an example used in the description of the seventh embodiment for clarity is executed in number of units u=2 before giving a specific description of the processing method. In the seventh embodiment, although calculation is carried out as shown in FIG. 25, the corresponding calculation is shown in FIG. 26. In FIG. 26, as in FIG. 25, a column designates a unit, and a line designates the step. In addition, the digit round-up is indicated by the arrow expressed by dotted line, and the accumulated value is designated by the arrow expressed by solid line. In this example, when n=2, u=2, the unit 0 is responsible for calculation of x(0), x(1), N(0), and N(1), and the unit 1 is responsible for calculation of calculation of x(2), N(2) and a round-up word. Namely, each unit is responsible for calculation of two contiguous words. Here, it must be noted that, unlike the seventh embodiment, in the ninth embodiment, it is required to carry out digit adjustment of process of the digit round-up and accumulated value in order to carry out calculation of "s" contiguous words (two words in this case) in each unit.

When process of the unit i in the ninth embodiment is generally described, it can be written as follows.

Process algorithm of the unit i
$C(x(si+k-1)y(j))=0$, $C(N(si+k-1)t(j)=0$
(for i=0, k=k & j=0, ..., n)
$M(N(si+k+1)t(-1))=0$
for j=0, 1, ..., n
for k=0, 1, ..., s-1

$$C(x(si+k)y(j))\|M(x(si+k)y(j))=x(si+k)y(j)+C(x(si+k-1)y(j))+M(N(si+k+1)t(j-1)) \quad (34)$$

next k
if (i=0)

$$t(j)=N_{inv} \cdot M(x(0)y(j)) \quad (35)$$

for k=0, 1, ..., s-1

$$C(N(si+k)t(j))\|M(N(si+k)t(j))=N(si+k)t(j)+C(N(si+k-1)t(j))+M(x(si+k)y(j)) \quad (36)$$

next k
next j

Namely, with respect to each of j=0, 1, ..., n, the unit i sequentially processes x(si+k)y(j) for k=0, 1, ..., s-1. With respect to N(si+k)t(j) as well, this unit sequentially processes it for k=0, 1, ..., s-1. After the unit i has ended process of x(si+s-1)y(j), the unit i+1 starts process of x(s(i+1))y(j). Similarly, after the unit i has ended process of N(si+s-1)t(j), the unit i+1 starts process of N(s(i+1))t(j). In addition, the unit 0 carries out calculation of t(j) in equation (35). As described above, a process identical to a case of $u \geq n+2$ can be achieved in a fewer number of units.

Now, an implementation method in the modular multiplication apparatus 140 for the above process will be described here. The role of elements in a unit is identical to that according to the seventh embodiment. The ninth embodiment is greatly different from the seventh embodiment in that it is required to carry out digit adjustment of the digit round-up C and accumulated value M because calculation of s contiguous words is carried out in each unit. This is achieved by storing calculated values of C and M in a RAM or its substitute, and supplying them to a calculation unit at a proper timing. The Modular multiplication control unit 130 controls this timing.

First, x and N input to the Modular multiplication control unit 130 are divided on a word by word basis, respectively; x(si+k) and N(si+k) (k=0, 1, ..., s-1) are stored in RAM1 of the unit i; and the stored data is provided to the registers R1 and R2 of each unit at a proper timing of calculation. In addition, y is divided on a word by word basis, and is stored in RAM1 of the unit 0. With advancement of the steps, y(j) is sequentially delivered from the unit 0 to the unit 1, from the unit 1 to the unit 2 via wires A and "a" until the unit u has been reached. The externally calculated $N_{inv}$ as well is assumed to be stored in the unit 0.

Operation of the unit i can be roughly divided into two steps. One is a step of calculating x(si+k)y(j) in equation (34) (k=0, 1, ..., s-1), and the other is a step of calculating N(si+k)t(j) in equation (36) (k=0, 1, ..., s-1).

In the step of calculating x(si+k)y(j) (k=0, 1, ..., s-1) in equation (34), x(si+k) (k=0, 1, ..., s-1) is sequentially read out from RAM1 to the register R1 if required. In addition, as described previously, y(j) is assumed as having been stored from the unit i-1 to the register R2 through the wire "a".

First, calculation of x(si)y(j), namely k=0, is carried out. C(x(si-1)y(j)) in equation (34) is a round-up value from the low-order word, and is delivered from the unit i-1 to the registers R7 and r2 C(x(si-1)y(j)) is obtained by adding a round-up value in R7 and a round-up value in r2. In addition, M(N(si+1)t(j-1)) is an accumulated value from the upper-order word, and this value is read out from RAM2, and is stored in the register R4. Under this condition, equation (34) is calculated, and the accumulated value M(x(si)y(j)) is stored in the register R3, and is delivered to RAM2. The round-up C(x(si)y(j)) is stored in the registers R6 and r1, and is used when x(si+1)y(j) is calculated. Here, C(x(si)y(j)) is obtained by adding a round-up produced by a multiplier and a round-up produced by an adder. The round-up of the multiplier is stored in the register R6, and the round-up of the adder is stored in the register r1.

Then, calculation of x(si+1)y(j), x(si+2)y(j), ..., x(si+s-1)y(j) is carried out similarly. In x(si+s-1)y(j), the accumulated value M(N(s(i+1))t(j-1)) must be added. This value has been already stored in register R5 as described later in the step of N(si+k)t(j), and is added. In addition, the round-up value C(x(si+s-1)y(j)) is used when x(s(i+1))y(j) of the unit i+1 is calculated, and thus, is delivered to the registers R7 and r2 of the unit i+1 through wires B and b.

Next, in the step of calculating N(si+k)t(j) (k=0, 1, ..., s-1) in equation (36), N(si+k) (k=0, 1, ..., s-1) is sequentially read out from RAM1 to the register R1 if required. In addition, as described previously, t(j) is assumed as having been stored from the unit i-1 to the register R2 through the wire "a".

First, calculation of N(si)t(j), namely k=0, is carried out. C(N(i-1)t(j)) of equation (36) is a round-up value from the low-order word, and is delivered from the unit i-1 to the registers R7 and r2 (C(N(i-1)t(j)) is obtained by adding a round-up value in R7 and a round-up value in r2). In addition, the accumulated value M(x(si)y(j)) is read out from RAM2, and is stored in the register R4. Under this condition, equation (36) is calculated. The accumulated value M(N(si)t(j)) is stored in the register R5 of the unit i-1, and the round-up value C(N(si)t(j)) is stored in the registers R6 and r1, and used when N(si+1)t(j) is calculated. Here, C(N(si)t(j)) is obtained by adding a round-up produced by a multiplier and a round-up produced by an adder. The round-up of the multiplier is stored in R6, and the round-up of the adder is stored in r1.

Then, calculation of N(si+1)t(j), N(si+2)t(j), ..., N(si+s-1)t(j) is carried out, similarly. Unlike a case of k=0, the accumulated value M(N(si+k)t(j)) is stored in the register R3 of the unit i, and is delivered to RAM2. In addition, in N(si+s-1)t(j), the round-up value C(N(si+s-1)t(j)) is used when N(s(i+1))t(j) of the unit i+1 is calculated, and is delivered to the registers R7 and r2 of the unit i+1 through the wires B and b.

In addition, the unit 0 carries out calculation of t(j) in equation (35) other than the above calculation of x(si+k)y(j) and N(si+k)t(j). This is calculated by storing the accumulated value M(x(0)y(j)) in the register R2; reading out $N_{inv}$ from RAM1; storing the readout value in the register R2; and using it. The thus calculated t(j) is sequentially delivered to the upward-order units through the wires A and "a".

Thereafter, each of the u units repeats calculation of x(si+k)y(j) (k=0, 1, ..., s-1) and N(si+k)t(j) (k=0, 1, ..., s-1) up to j=n, thereby carrying out Montgomery multiplication.

In the seventh embodiment, a description has been given with respect to a case of u=n+2. In the eighth embodiment, a description has been given with respect to a case of u>n+2.

In the ninth embodiment, a description has been given with respect to a case of u<n+2. The seventh embodiment is identical to the ninth embodiment in that s=1. Therefore, with the configurations shown in FIG. 18, FIG. 19, FIG. 20, and FIG. 21, control caused by the modular multiplication control unit 130 is modified, whereby a modular multiplication apparatus capable of executing calculations according to the eighth and ninth embodiments can be achieved. Thus, it is found that calculations of a variety of modulo sizes can be efficiently executed by using the same modular multiplication apparatus. In addition, calculation of the same modulo size can be efficiently carried out irrespective of the number of units for use in calculation. Thus, it is found that a system having excellent scalability is provided.

Figure 27:
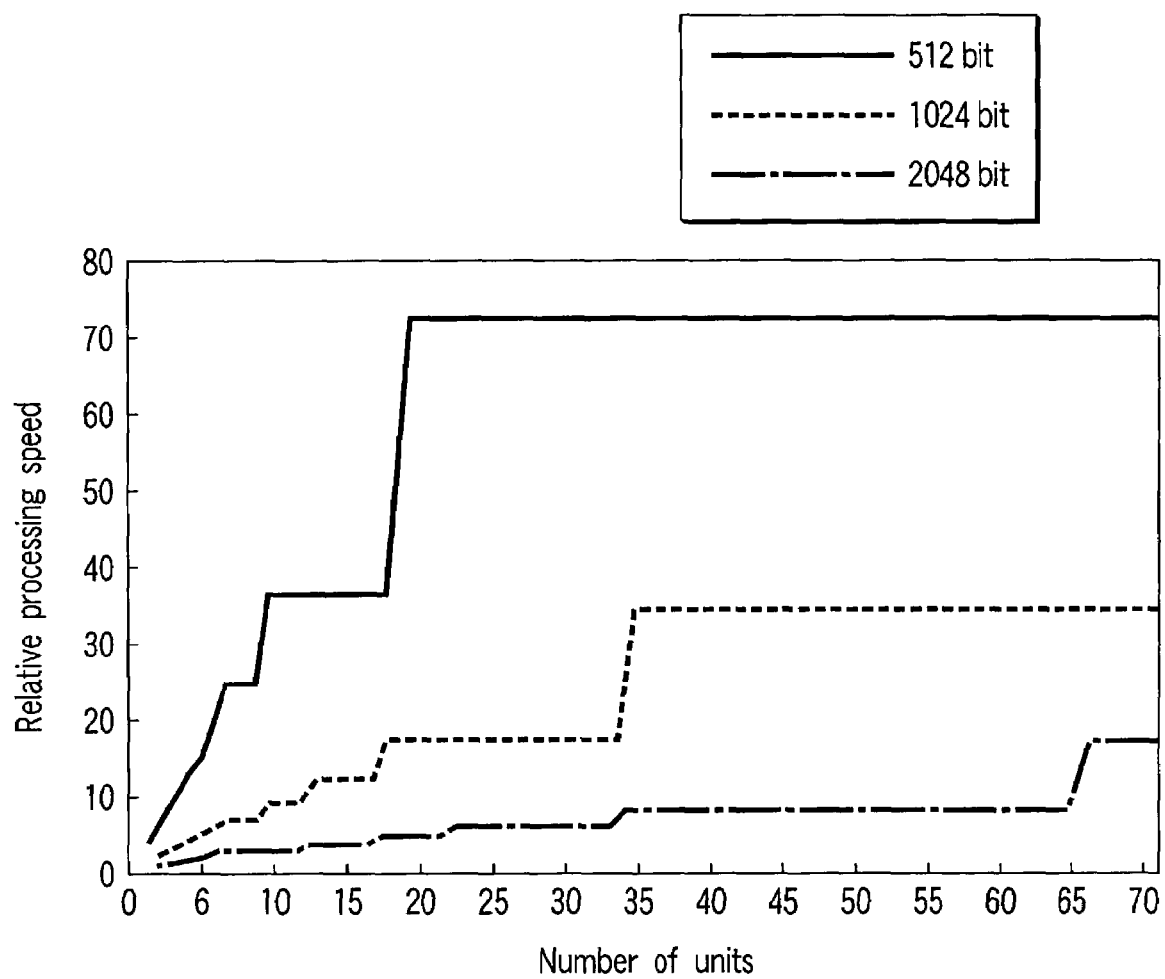
FIG. 27 is a diagram showing comparison in relative process speed based on the number of processing units and modulo size in the ninth embodiment.

With such a configuration, a relationship in relative process speed between the number of units and excess dividing operation is as shown in FIG. 27. FIG. 27 shows the number of processing units in a modular multiplication apparatus and a relative process speed of a modular exponentiation when the size of modulo N is defined as 512 bits, 1024 bits, and 2048 bits. In the case of u≦n+2, it is found that equipment efficiency which can be defined by a process speed per circuit scale is constant irrespective of the number of units.

In addition, with respect to the circuit scale, each unit comprises one multiplier, one adder, and registers or the like, thus making it possible to sufficiently reduce the scale as compared with that of the fifth document.

TENTH EMBODIMENT

Now, a description will be given with respect to a tenth embodiment of the present invention. In the following embodiments, a process for t-calculation in advance according to the first to sixth embodiments is combined in the seventh to ninth embodiments in which efficiency of pipeline process is improved by assigning several contiguous words of a target operator from a low-order unit according to the modulo size of modular multiplication and the number of processing units so that the load of each processing unit is made uniform. As one example, the tenth embodiment in which the t-calculation unit 40 is made independent in the ninth embodiment will be described with reference to FIG. 29.

Figure 29:
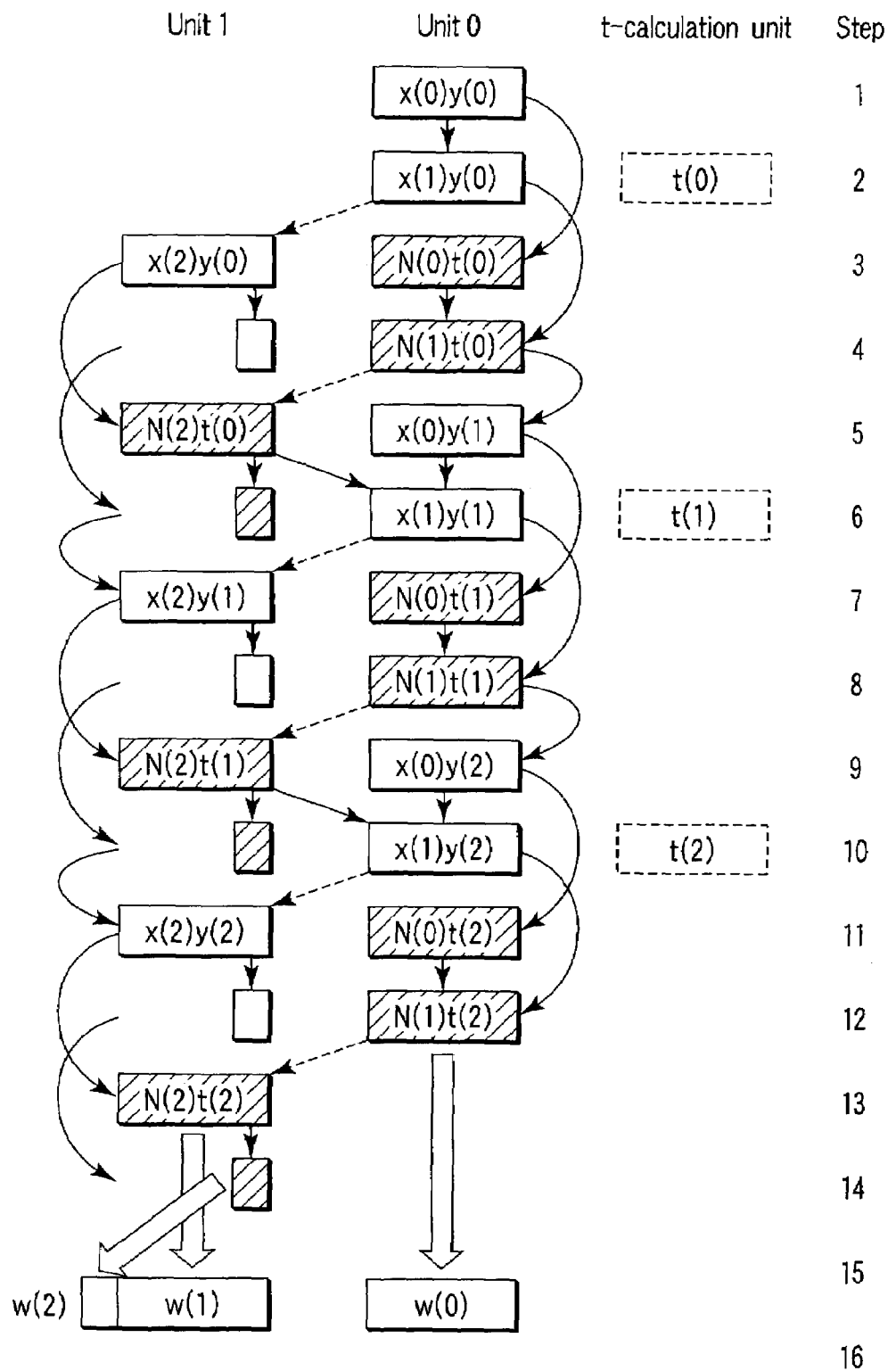
FIG. 29 is a diagram showing a procedure for calculating xy+Nt according to a tenth embodiment of the present invention.

In the tenth embodiment, a description will be given with respect to a case in which the number of units u is fewer than the number of a word of modulo N, namely, with respect to a case of u<n+2. In the tenth embodiment, calculation is carried out as shown in FIG. 29. In this example, when n=2, u=2, unit 0 is responsible for calculation of x(0), x(1), N(0), and N(1), and unit 1 is responsible for calculation of x(2), N(2), and a round-up word. Namely, each unit is responsible for calculation of two contiguous words, and carries out the step of calculating x(i)y(j) and the step of calculating N(i)t(j). In addition, the t-calculation unit 40 carries out calculation of t(j) based on an input M(x(i)y(j)) from unit 0. At this time, if each unit is responsible for calculation of the number of words "s" which is not smaller than 2, calculation in the t-calculation unit 40 in advance is not required. In the case where the number of words "s" is 1, it is required to make calculation in advance as in the first embodiment.

In the ninth embodiment shown in FIG. 26, t-calculation has been made in unit 0 (steps 3, 8, . . . ). In the tenth embodiment shown in FIG. 29, the t-calculation unit carries out t-calculation in parallel to a process in the main calculation unit 141 in step 2, 6, . . . , and thus, further high speed processing is achieved. Although it is not shown, the seventh, eighth, and ninth embodiments can be modified as shown in FIG. 29.

In this manner, in the seventh to tenth embodiments, even in the case where the number of units in a modular multiplication apparatus is fewer than the number of words "s" of modulo N, optimal throughput can be achieved in the number of units. In addition, there is provided a system having a high module performance per unit merely by changing control of Montgomery multiplication. Thus, a modular multiplication apparatus having a flexible configuration which is compatible with a variety of modulo sizes can be configured by using a unit as a module.

ELEVENTH EMBODIMENT

In an eleventh embodiment of the present invention, a description will be given with respect to a system for making a plurality of calculations at the same time by using one modular multiplication apparatus. In the seventh, eighth, and ninth embodiments each, a description has been given with respect to a case in which one modulo multiplying operation is carried out by one modular multiplication apparatus. The configurations of units shown in FIG. 19, FIG. 20, and FIG. 21 each have a high module performance. By dividing "u" units owned by one main calculation unit 131 into a set of contiguous units, it is possible to carry out a plurality of Montgomery multiplying operations in parallel to each other. At this time, the calculation control unit 130 controls this calculation.

As an example, let us consider a modular multiplication apparatus 140 having a main calculation unit 131 which has eight units 141. At this time, for example, when $xyR^{-1}$ mod N has been input with respect to a value of 30 words as modulo N, one unit is responsible for calculation of four words.

Here, let us consider a case in which Montgomery multiplication $xyR^{-1}$ mod N in accordance with modulo N of 30 words and Montgomery multiplication $abR'^{-1}$ mod N' in accordance with modulo N' of 14 words have been input to this modular multiplication apparatus.

In this case, one implementation system include a system for calculating $abR'^{-1}$ mod N' after calculation of $xyR^{-1}$ mod N has been ended.

Figure 28:
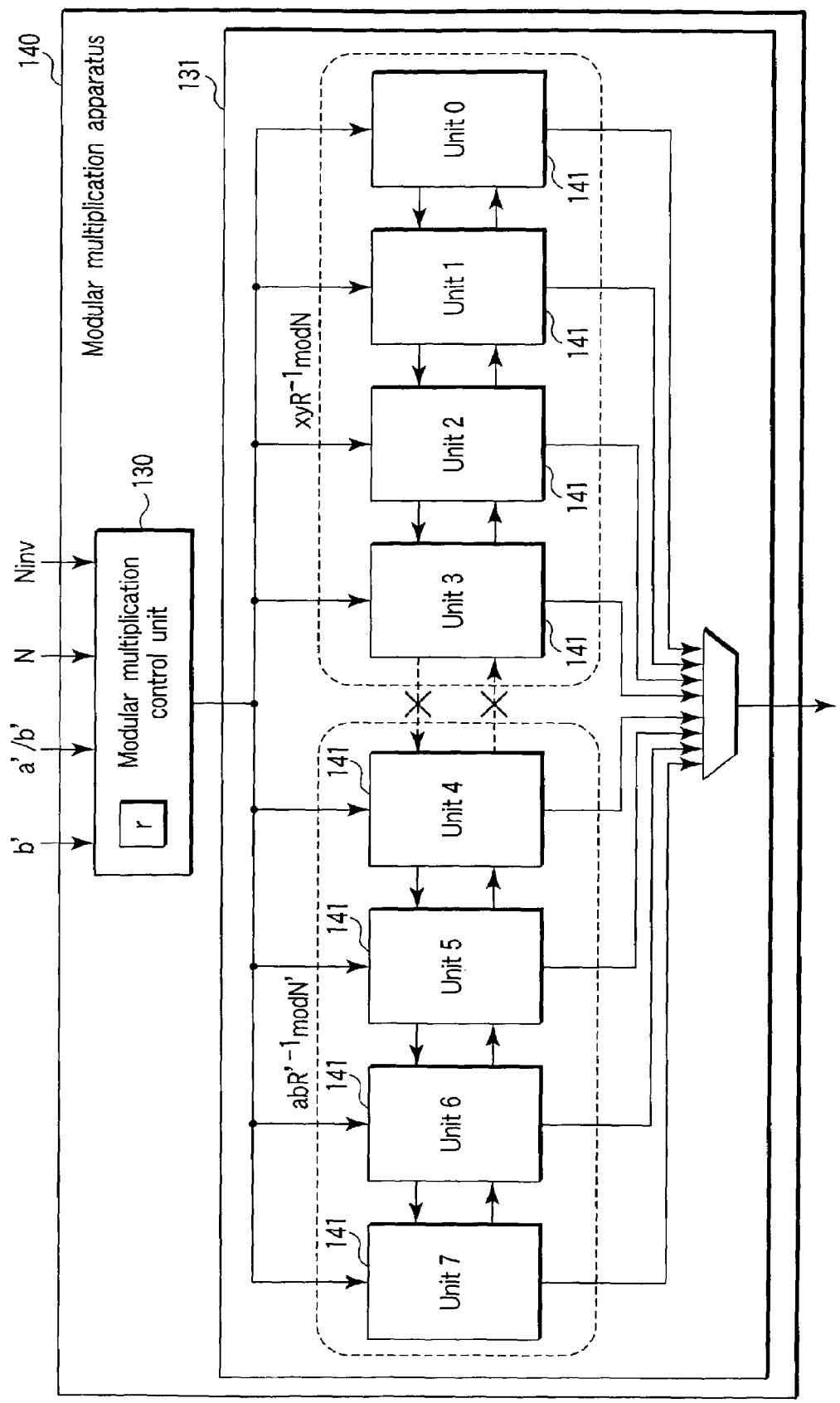
FIG. 28 is a diagram showing a modulo multiplying apparatus according to an eleventh embodiment of the present invention.

In the eleventh embodiment, this calculation is carried out by using one modular multiplication apparatus to be divided into two steps. For example, calculation of $xyR^{-1}$ mod N is carried out from unit 0 to unit 3, and calculation of $abR'^{-1}$ mod N' is carried out from unit 4 to unit 7. Namely, unit 0 to unit 3 are responsible for calculation of $xyR^{-1}$ mod N, and unit 4 to unit 7 are responsible for calculation of $abR'^{-1}$ mod N'. This calculation is shown in FIG. 28. In this case, transmission of information from unit 3 to unit 4 does not take place.

The Modular multiplication control unit 130 controls calculation when the plurality of Montgomery multiplying operations are carried out. Unit 0 to unit 3 and unit 4 to unit 7 are operated independently, whereby a plurality of Montgomery multiplying operations can be executed in parallel to each other.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be carried out as a computer readable recording media having recorded therein a problem which causes a computer to execute predetermined means, to function as predetermined means, or to achieve a predetermined function.

What is claimed is:

1. A modular multiplication apparatus comprising:
   a first calculation unit which comprises multiplier-adder units allocated in series in order to repeatedly perform pipeline processings, one of the multiplier-adder units being a first unit and another one of the multiplier-adder units which is connected to the first unit being a second unit; and
   a second calculation unit configured to perform a calculation using an output of the first unit and an output of the second unit for one of the pipeline processings, a result of the calculation being supplied to the first unit as a parameter for a next one of the pipeline processings, whereby the first calculation unit calculates a modular multiplication by repeatedly performing the pipeline processings.

2. The apparatus according to claim 1, wherein each of the multiplier-adder units comprises one multiplier which alternatively executes two types of multiplications in a modular multiplication.

3. A modular exponentiation apparatus for obtaining an exponential modulo $a^e$ mod N based on integers a, e, and N, comprising:
   a modular multiplication apparatus according to claim 1; and
   an output unit which compares the result output from the first calculation unit after performing the pipeline processings and the integer N, outputs a value obtained by subtracting the integer N from the result when the result is not smaller than the integer N, and outputs the result when the result is smaller than the integer N.

4. A modular multiplication apparatus comprising:
   a first calculation unit which comprises multiplier-adder units allocated in series in order to repeatedly perform pipeline processings based on an intermediate result of the pipeline processings; and
   a second calculation unit which includes a multiplier-adder unit which calculates a parameter indicating the intermediate result of the pipeline processings and supplies the calculated parameter to the first calculation unit, the first calculation unit repeatedly performing pipeline processings based on the parameter calculated by the second calculation unit.

5. The apparatus according to claim 4, wherein each of the multiplier-adder units comprises one multiplier which alternatively executes two types of multiplications in a modular multiplication.

6. The apparatus according to claim 5, wherein the one multiplier calculates the parameter in a first clock of two clocks which are a minimum operating cycle of the modular multiplication, and outputs the parameter in a second clock of the two clocks.

7. A modular multiplication apparatus comprising:
   a first calculation unit which comprises multiplier-adder units allocated in series in order to repeatedly perform pipeline processings; and
   a control unit configured to control the pipeline processings according to a modulo size of a modular multiplication and the number of the multiplier-adder units such that a load of each of the multiplier-adder units is made substantially uniform.

8. The apparatus according to claim 7, wherein each of the multiplier-adder units comprises one multiplier which alternatively executes two sets of different multiplications in the modular multiplication, the number of the multiplications in each set being according to the modulo size and the number of the multiplier-adder units.

9. The apparatus according to claim 7, wherein the control unit assigns several contiguous words of a target operator from a lowest-order multiplier-adder unit according to the modulo size and the number of the multiplier-adder units such that a load of each of the multiplier-adder units is made substantially uniform, and supplies the target operator to the multiplier-adder units so as to make digit adjustment during the pipeline processings.

10. A modular exponentiation apparatus for obtaining an exponential modulo $a^e$ mod N based on integers a, e, and N, comprising:
   a modular multiplication apparatus according to claim 7; and
   an output unit which compares a result of the pipeline processings and the integer N, outputs a value obtained by subtracting the integer N from the result when the result is not smaller than the integer N, and outputs the result when the result is smaller than the integer N.

* * * * *